US009880449B2

(12) United States Patent
Johnson

(10) Patent No.: US 9,880,449 B2
(45) Date of Patent: Jan. 30, 2018

(54) SUCTION CUP AND STRAP MOUNT FOR ACTION VIDEO RECORDING WITH AN ELECTRONIC DEVICE

(71) Applicant: August Andrew Johnson, Boise, ID (US)

(72) Inventor: August Andrew Johnson, Boise, ID (US)

( * ) Notice: Subject to any disclaimer, the term of this patent is extended or adjusted under 35 U.S.C. 154(b) by 0 days.

(21) Appl. No.: 14/553,671

(22) Filed: Nov. 25, 2014

(65) Prior Publication Data
US 2016/0381259 A1    Dec. 29, 2016

(51) Int. Cl.
| | |
|---|---|
| H04N 5/225 | (2006.01) |
| G03B 17/56 | (2006.01) |
| F16M 13/02 | (2006.01) |
| F16M 13/00 | (2006.01) |
| F16M 13/04 | (2006.01) |
| F16M 11/04 | (2006.01) |
| F16B 47/00 | (2006.01) |
| F16M 11/10 | (2006.01) |
| H04N 7/18 | (2006.01) |
| F16B 1/00 | (2006.01) |
| H04N 5/77 | (2006.01) |
| F16B 2/08 | (2006.01) |

(52) U.S. Cl.
CPC ............ *G03B 17/561* (2013.01); *F16B 47/00* (2013.01); *F16M 11/041* (2013.01); *F16M 11/10* (2013.01); *F16M 13/00* (2013.01); *F16M 13/02* (2013.01); *F16M 13/022* (2013.01); *F16M 13/04* (2013.01); *H04N 5/2252* (2013.01); *F16B 2/08* (2013.01); *F16B 2001/0028* (2013.01); *H04N 5/77* (2013.01); *H04N 7/185* (2013.01)

(58) Field of Classification Search
CPC ............ F16B 47/00; F16B 2001/0028; F16M 13/022; H04N 5/2252; H04N 5/77
See application file for complete search history.

(56) References Cited

U.S. PATENT DOCUMENTS

| | | | | |
|---|---|---|---|---|
| 2012/0168471 A1* | 7/2012 | Wilson | ...................... | A45F 5/00 224/152 |
| 2013/0161455 A1* | 6/2013 | DeJong | ................... | F16M 11/04 248/176.3 |
| 2013/0270129 A1* | 10/2013 | Johnson | ................. | A45C 11/38 206/216 |

(Continued)

*Primary Examiner* — Huy T Nguyen
(74) *Attorney, Agent, or Firm* — Barbara Pederson

(57) ABSTRACT

An injection molded mounting plate with removably attached suction cups, lower connector, and retention strap which securely hold an electronic device within a mounting system for action video recording. The mounting plate is preferably an injection-molded part with multiple suction cup slots to allow suction cups to be inserted therein for securing the electronic device in a horizontal position with an elastic retention strap securing mechanism to wrap around the mounting plate and the electronic device. An elastic strap extends from an upending portion of the mounting plate, extends through a slot in the mounting plate, wraps around the electronic device, and fastens back upon itself via hook and loop fasteners to capture the device. The design of the mounting plate and preferred length of the retention strap fit "most" smartphone designs. This universal mount can be affixed to a stationary object, or wearable in nature.

18 Claims, 16 Drawing Sheets

(56) References Cited

U.S. PATENT DOCUMENTS

2013/0306689 A1\* 11/2013 Johnson ................ A45C 11/00
                                                          224/181
2015/0048233 A1\* 2/2015 Dumas .................. F16M 11/32
                                                          248/550
2015/0191124 A1\* 7/2015 Du ...................... F16M 13/022
                                                          248/205.4

\* cited by examiner

SUCTION CUP AND STRAP MOUNT FOR ACTION VIDEO RECORDING WITH AN ELECTRONIC DEVICE

BACKGROUND OF THE INVENTION

Field of the Invention

The present invention generally relates to specialty mounts or holders for electronic devices that have video-recording capabilities. More particularly, the invention relates to apparatus for holding a portable electronic device, such as a cellular phone, smart phone, camera, or other digital media device, that may be strapped or otherwise secured to a mounting apparatus for action video recording from moving objects, surfaces, or body parts.

Related Art

There are many electronic device holsters, mounts, and mounting solution designs in the prior art. Still there is an absence of a mounting apparatus with suction cup capabilities and strap system that is operable with nearly all video-capable cellular smartphone designs. To the applicant's knowledge, there has not yet been disclosed a universal smartphone mount with suction cups and strap system, that can hold video-capable cellular smartphone in the desired orientation for recording action video during activities, or events.

With the development of information communication technology, cellular phones have become essential tools modern life. More recently, the cellular phone is provided with various functions, such as a camera, in addition to a function of simply calling or answering the telephone. The integrated camera has a variety of functions including video recording. Thus, the cellular phone is recognized as advanced video-recording equipment, going beyond the functionality of a traditional camera used solely for picture taking purposes.

At present, most of users taking action related video do so with specialty camera equipment such as GoPro, Garmin, Sony Action Cam, and Contour to name a few. In addition, these action cameras all rely on a variety of mounting options typically including: head mount, chest mount, bike mount, helmet mount, surfboard mount, car mount, gun mount, etc. As such, the specialty devices are allowed to be used during almost any activity due to these mounting systems that have been developed for each style of camera system. These specialty action cameras are equipped with a variety of video recording features that are not yet currently available on most smartphone devices. However, with the continual advance of smartphones, there is a segment of the market that desires to utilize their smartphone as their action camera recording device rather than spend considerable amounts of money on these specialty cameras. The capabilities of smartphones has advanced in recent years and will continue into the future thereby allowing more enhanced smartphone devices to compete with these action camera devices. As such, there is a segment of the market that desires to use their smartphone for capturing events, activities, and actions rather than using the alternative action cameras. With this concept in mind, there is now a need for a universal mounting system that is operable with nearly any modern day smartphone and is also operable with pre-existing mounting systems. Such a mount would be connectable to many existing mounting system designs that have become common with the action camera devices, thereby only requiring the one side of the two part mounting system to be provided, rather than the entire line of mounting options.

The modern day smartphone has become the preferred hand held video recording device for a high percentage of individuals during everyday use. There are a variety of mounting products or phone case mounts that allow a phone to be attached to a person's body allowing for video recording while attending events or doing activities. Many of these pre-existing designs are specific to one phone model and limited for use with a specialty mount design not commonly used. The existence of prior art designs associated with mounting a recording device during use, or attaching a device to a moving object, vertical surface, or horizontal surface during use is apparent, as several such designs may be found in the patent database. However, the Applicant is not aware of any pre-existing patents that are similar to the invention, in design, structure, or in that they contain a universal mounting plate with integrated suction cups and elastic strapping system combined to allow a person securely mount a wide array of smartphone models to the specialty mounting device that will securely hold the device during video action related video shooting. Additionally, the multi-purpose design incorporates an additional use for hands free pictures and video with integrated suction cups which can attach to smooth surfaces, while allowing the device to be strapped into place within the mounting device via retention strap. The device therefore serves two purposes; universal smartphone mount for action video recording capabilities and hands free pictures and video from a smooth surface, thereby providing dual functionality.

Primary problems with much of the prior art includes: mounts adapted only for specific, specialty-camera designs, being usable with only one type of device, and/or being complex or expensive. Applicant's preferred multi-purpose suction cup and strap mount apparatus solves these issues in that is it small, lightweight, highly effective holding strength, can be used with a high percentage of modern day smartphone devices, and is relatively inexpensive to manufacture.

With the vast array of smartphone sizes and varying locations of operational buttons, such a universal mounting plate requires specific and unique design features to accommodate such a broad array of smartphone devices. The preferred embodiment solves the stated issues in that employs multiple suction cups that can attach to a screen and a flexible strapping system that can fit a high percentage of smartphones or other electronic devices with video functions, and that will secure the device with or without a case fastened to the device. Further, the preferred mounting platform can be attached to a variety of pre-existing mounting mechanisms that have become commonplace. With the advancement of cell phone technology, there is a need for a universal, convenient, and inexpensive mount that is operable with most present day smartphones and other similar electronic devices, allowing for action video recording, also serving the function of hands free pictures and video due to the multi-purpose design. This invention addresses that need due to the unique design features.

SUMMARY

The present invention comprises a specialty mount apparatus for holding an electronic device securely in place while recording video or taking pictures. A unique mounting plate which holds the electronic device securely in place via multiple suction cups with securing elastic strap system which provides additional holding abilities for the device during action related video recording. The specialty device is adapted to provide both a universal smartphone mount, also allowing for the secondary purpose of hands free pictures and video. Due to the multi-functional design of the device, the accessory is therefore identified as being a two-in-one product: allowing for action related recording and also attachment to smooth surfaces for hands free pictures and video.

The preferred mount design contains a circular mounting feature at the lower end of the mounting plate which is compatible with existing action camera mounts. The present invention can be easily attached to common action camera mounts with holes and a screw for the attachment method to allow the specialty mounting plate to be easily affixed/attached at the open end of the mount and then the screw is affixed to the mount to keep the parts connected. As such, there are two components to the design, the pre-existing mount with open end receiver (identified as the female portion of the mount) which also includes the screw attachment, and the invented specialty mounting plate with the corresponding male end of the attachment that will thereby allow the two parts to be connected together via the aligning holes and screw mechanism.

The custom mounting plate is a specialty injection molded part, created from plastics such as nylon etc. The mounting plate is designed with a two protrusions with horizontal holes at the lower end, thereby providing a convenient attachment location at which to affix the screw mechanism laterally into the open holes which are aligned between the male and female sides of the mount connection. The molded part includes two distinct sides; front and back; with design elements located at each side accordingly. The front of the mounting plate includes two or more slot openings at which to insert and removably attach side pilot hole suction cups. The suction cups are preferably medium in size, less than 2 inches in diameter, and comprise a knob with side pilot hole feature that attaches into the slot openings at the front of the mounting plate. The multiple suction cups are oriented in a forward position to provide a method for attaching the cups and attached mounting plate to the screen of an electronic device. The suction cups and associated slots are spaced accordingly in the necessary dimensions to allow for attachment to a high percentage of modern day smartphones with touch screen capabilities.

The width of the mounting plate is designed to allow the suction cups to attach at the preferred location generally to keep the device centered on the mount, thereby allowing the camera lens to remain exposed while oriented in landscape (aligned horizontally). The preferred mounting plate includes an elastic strap assembly which can attach to strap arms at the top of the mounting plate. The strap fastens to the slot/arm-system at the top of the mounting plate by means of an open loop sewn in place at the end of the strap. The strap is sized in length so that it may surround both the molded part and device circumference and attach back upon itself via hook and loop fasteners sewn in place on the strap.

The preferred strap assembly comprises top, bottom, front and rear portions, wherein the mounting plate preferably serves as the connector between top portion of the strap with sewn loop. The strap assembly extends along the back side of the molded part, through a slop opening within the lower portion of the mounting plate then extending around the device and upwards to connect back at the top portion of the strap at the exposed hook/loop Velcro. The strap system preferably allows the strap to encircle the device to an extent that retains the mounting plate with captured electronic device while attached to the associate mount. Thus, once the user has turned on the recording feature of the electronic device, the device is attached to the suction cups onto the screen and then the elastic retention strap is pulled around the device and secured in place via hook/loop fastener to keep the device in place.

The electronic device is captured in the mount apparatus by two attachment means implemented in a two step process; the first of which is done by compressing the multiple suction cups to the screen of the device, secondly the distal end of the retention strap is extended through the lower strap opening near the lower portion of the device and wrapped up and around the back of the device and extended over the top of the device and mount thereby allowing the distal end of the retention strap to fasten in place back onto itself via hook and loop quick connect/disconnect fasteners. The suction cups thereby securely retain the device in place onto the mount, after which the strap is extended over and around the device and secured in place. This two strep process allow the device to initially be securely attached to the mount allowing the user to let go of the device and then pull the strap around the device and mount and attach the distal end of the strap in place. The dual use of the suction cups and strap provide a strong hold and attachment of the device onto the mount, however is relatively simple to operate, and is operable with a high percentage of smartphone designs. As such, the provided strapping system and suction cup enabled mounting plate will conform/fit most cellular phone devices having a video function, or similar electronic devices having video capabilities and touch screen. Most preferably, the retention strap is both flexible (or substantially flexible) and elastic (or substantially elastic), wherein the flexibility and elasticity adapts certain embodiments of the apparatus to fit many different electronic devices. Additionally, the dimensions and spacing of the suction cups while attached to the mounting are oriented to optimally-accommodate nearly any electronic device with a touch screen, allowing for attached in the preferred recording orientation; landscape orientation.

In certain embodiments, the retention strap fastens in a tightened configuration by means of patch(es) of hook/loop fastener. The strap's elasticity, and the leeway in connection location provided by hook/loop fastener, allows the user to tighten the retention strap around/against the device to hold the device securely in place on/against the suction cups and mounting plate mechanism. In the primary function for securement to a mount during action video, the retention strap connects to a strap slot and strap arms located at the top portion of the mounting plate, extends downward along the rear of the plate and loops through another opening at the lower portion(s) of the plate and extends through to the front to form a space between the strap and the plate for receiving the electronic device. After looping through said another portion, the retention strap may attach to itself in the tightened configuration for capturing the electronic device after it is attached to the suction cups. Alternatively, other fasteners and fastener locations for latching/securing the retention strap in a tightened configuration may be used, for example, hook-and-loop cooperating patches at other locations on the strap, or fastener(s) on the mounting plate that cooperate with a fastener(s) on the retention strap.

The mounting plate assembly is specially-adapted so that capturing the electronic device with the suction cups suspended from the platform so that mount itself does not press buttons that will mistakenly operate device functions. The elastic strap attaches to the mounting plate and wraps around the phone at a tension that prevents the buttons of the electronic device from being compressed when the device is tightly captured by the suction cup surfaces while retained within the strap.

The mounting plate assembly is specially-designed so that the mount can serve a dual purpose. The injection molded mount can be used to strap a device to the back side of the mount via the elastic strap to allow for the additional functionality of taking hands free pictures or video. The strap can be pulled around a device while screen is adjacent to the back side of the mount, the elastic strap is then pulled through the lower slot opening and extended upward between the two suction cups and attached upon itself via hook/loop fasteners, which then allows the forward facing suction cups to be exposed to allow attachment to a smooth surface. The strap at the rear when inserted through the lower slot opening creates an open loop which acts as a logical location at which to insert the device with camera facing to the rear of the amount (opposite of the suction cups). Once the device is inserted into the strap loop opening, the strap can then be pulled downward and back up around the device to attach at the patch of hook/loop fastener back at the top of the mount, thereby securing phone within the mount. Once properly secured and timer set, or video recording function enacted, the exposed suction cups can then be attached to a smooth surface and suspended for hands free pictures and video use. This is intended to be the secondary feature of the device but provides for a convenient and easy-to-use method that dramatically enhances the functionality of the invention, while not adding any significant cost. Thus the dual purpose nature of the design is unique in allowing both an extended video recording device, in conjunction with the hands free photo and video capabilities.

While the following description details preferred embodiments, it will be understood that such detail need not be strictly adhered to, but that additional changes and modifications may suggest themselves to one skilled in the art, all falling within the scope of the invention as defined by the claims.

BRIEF DESCRIPTION OF THE DRAWINGS

The following description of the apparatus can be understood in light of the Figures, in which.

DETAILED DESCRIPTION

Figure 11:
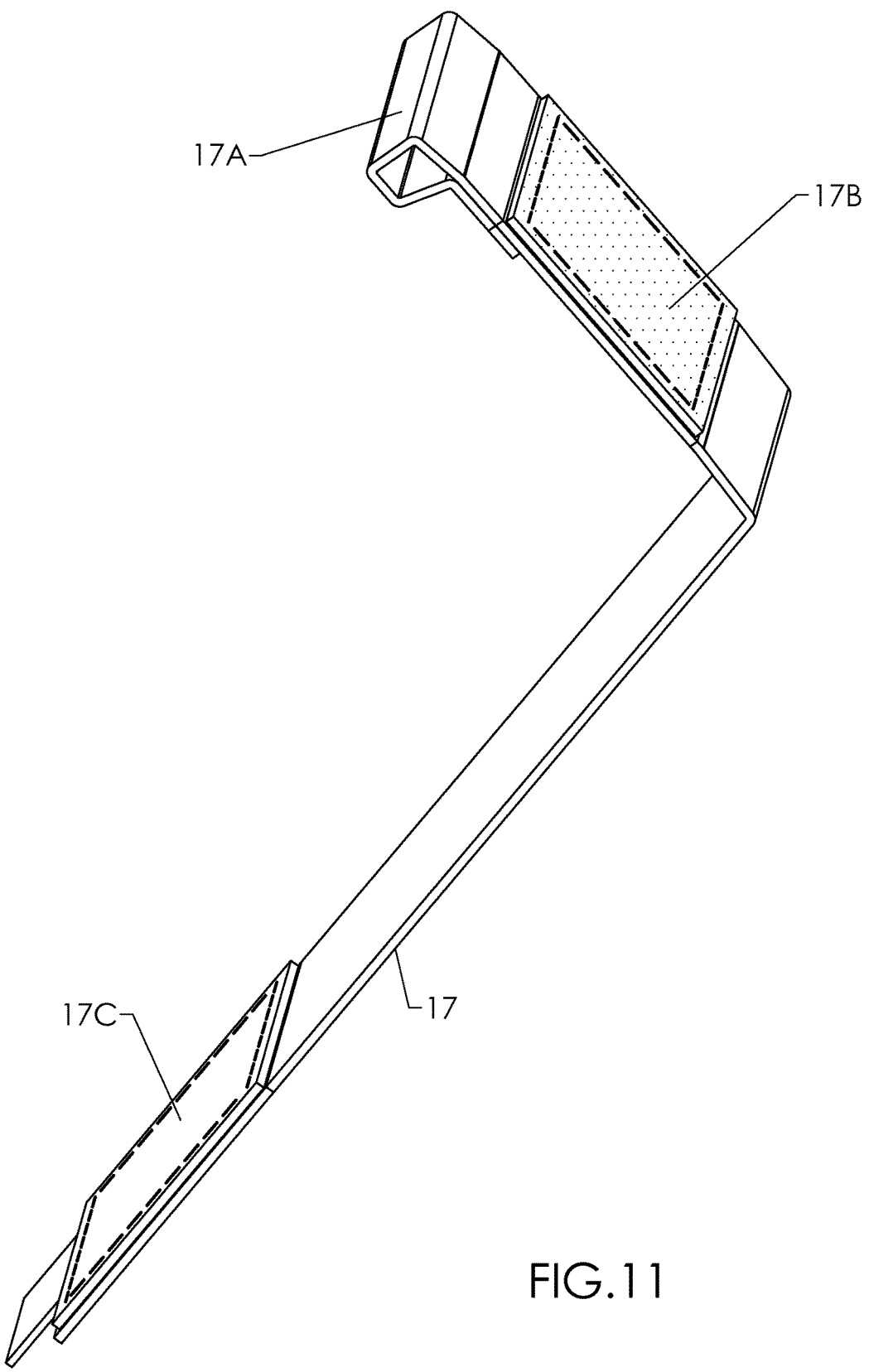
FIG. 11 is a side view of the preferred elastic retention strap with multiple patches of hook and loop fastener securely sewn in place.
Figure 12:
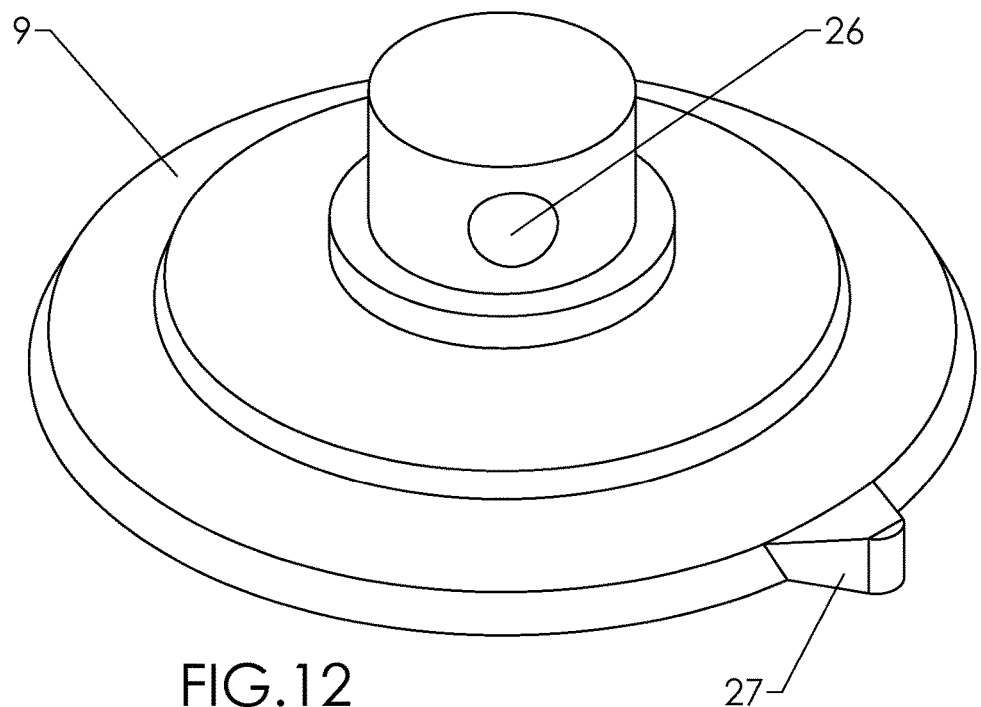
FIG. 12 is an isometric view of the preferred side pilot hole suction cup with release tab.
Figure 13:
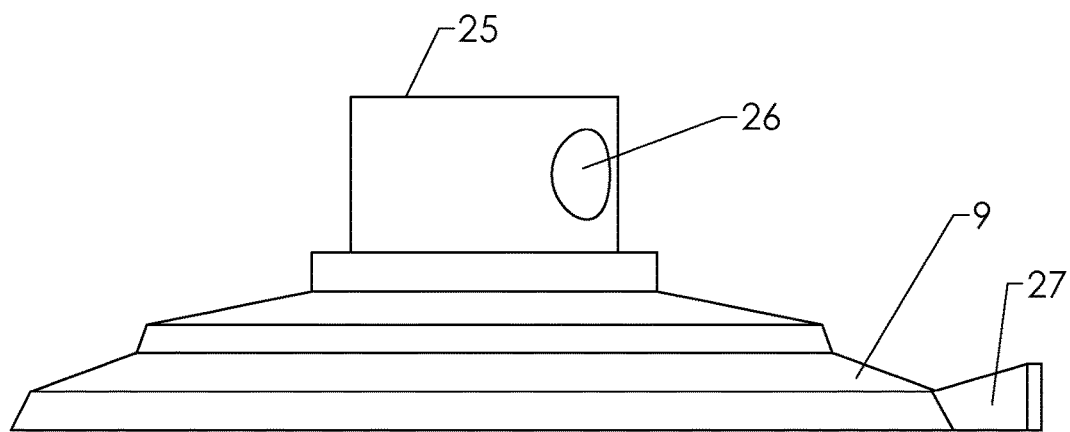
FIG. 13 is a front view of the preferred side pilot hole suction cup depicted in FIG. 12.
Figure 14:
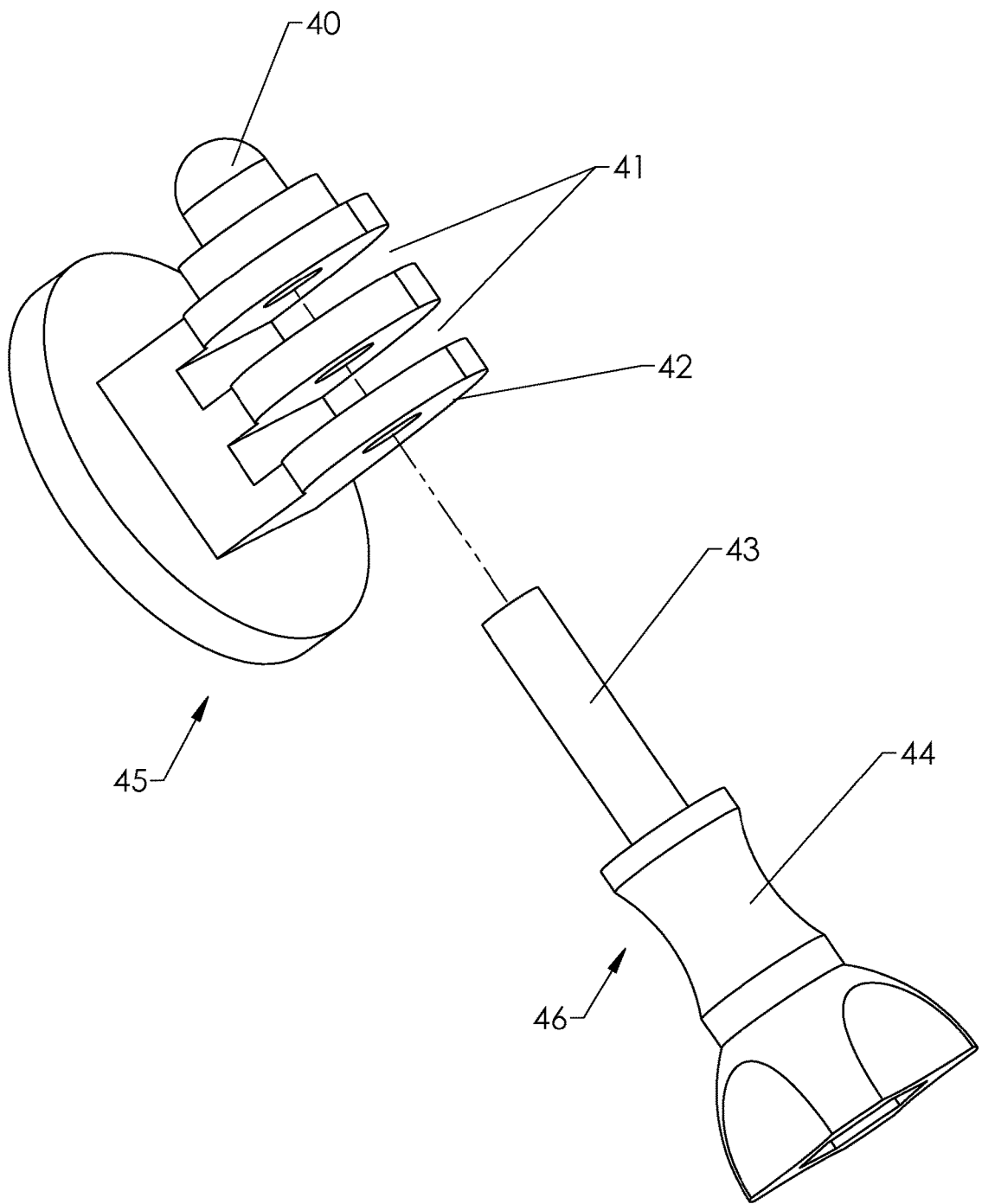
FIG. 14 is a front view of the preferred pre-existing mounting mechanism that is common in the marketplace. The female portion of the mount and screw attachment mechanism are shown here.
Figure 15:
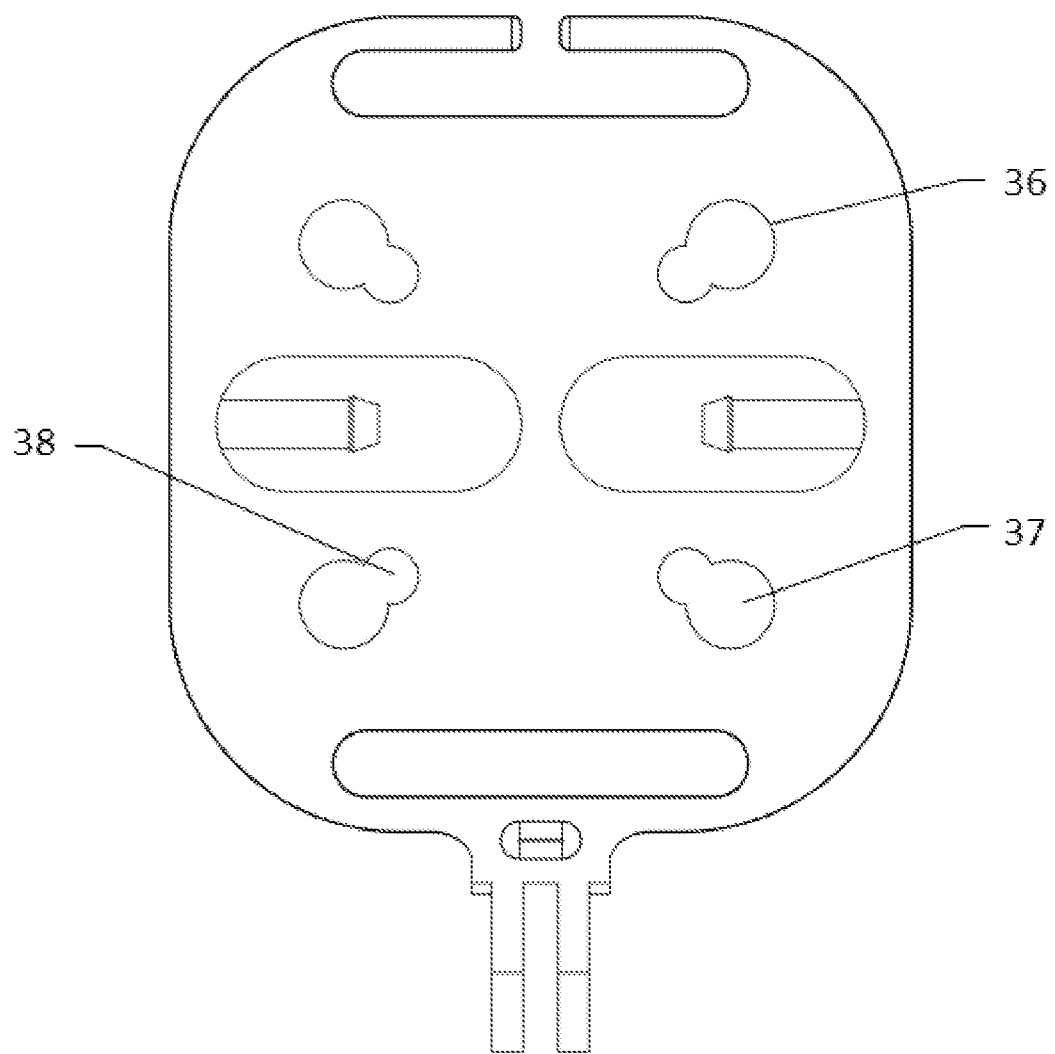
FIG. 15 is a front view of an alternative design concept with allow for the incorporation of smaller suction cups within the same original mount design depicted in FIG. 1. These smaller cups would not be used on conjunction with the larger cups, but would be an alternative as the design allow the cups to be removably attached, thereby selected for the intended use or desired attachment strength.
Figure 16:
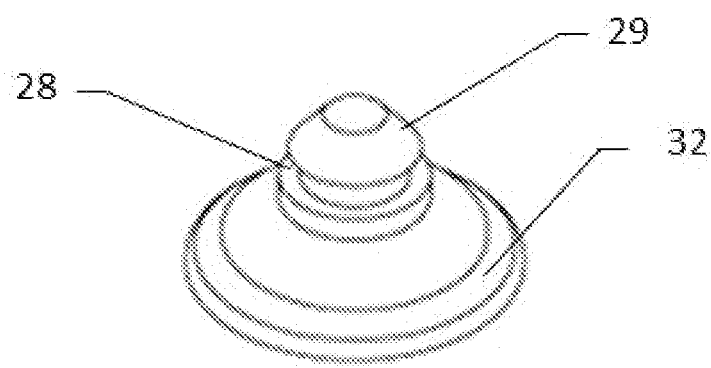
FIG. 16 is an isometric view of the preferred mini thick neck mushroom head suction cup, which can be used in the alternate slot design shown in FIG. 15.
Figure 17:
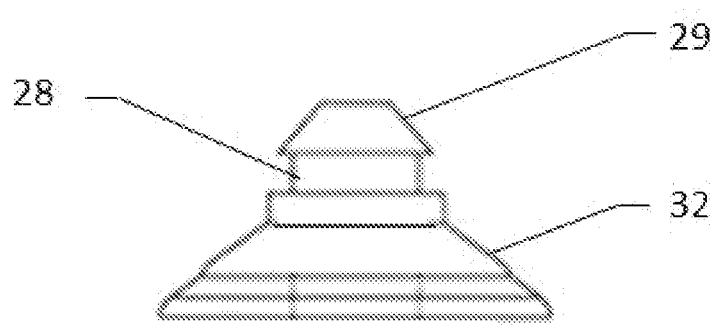
FIG. 17 is a side view of the preferred mini thick neck mushroom head suction cup depicted in FIG. 16.

Referring specifically to the figures, there is shown one, but not the only, embodiment of the invented mounting apparatus for securing an electronic device that preferably contains video recording capabilities. The mount apparatus comprises a mounting plate assembly comprising a male end which attaches to the female end of a fixed mount to complete the mount system. The invented mount also comprises a retention strap assembly which removably attaches to the mount (FIGS. 6, 7, 9, 10, and 11). The female side of the mount system and screw mechanism are depicted in FIGS. 8 and 14. FIGS. 1-5 show details of the mounting plate assembly alone, FIG. 11 shows the elastic retention strap alone, and FIGS. 12 and 13 show details of the preferred side pilot hole suction cups along, while FIGS. 18-19 show the alternative thick neck mushroom head suction cup alone. FIGS. 16, and 17 depict alternative design orientation using alternative suction cup slots for mini suction cups, while FIG. 15 depicts the combined design which incorporates slots for both mini thick neck cups and side pilot hole cups.

Figure 1:
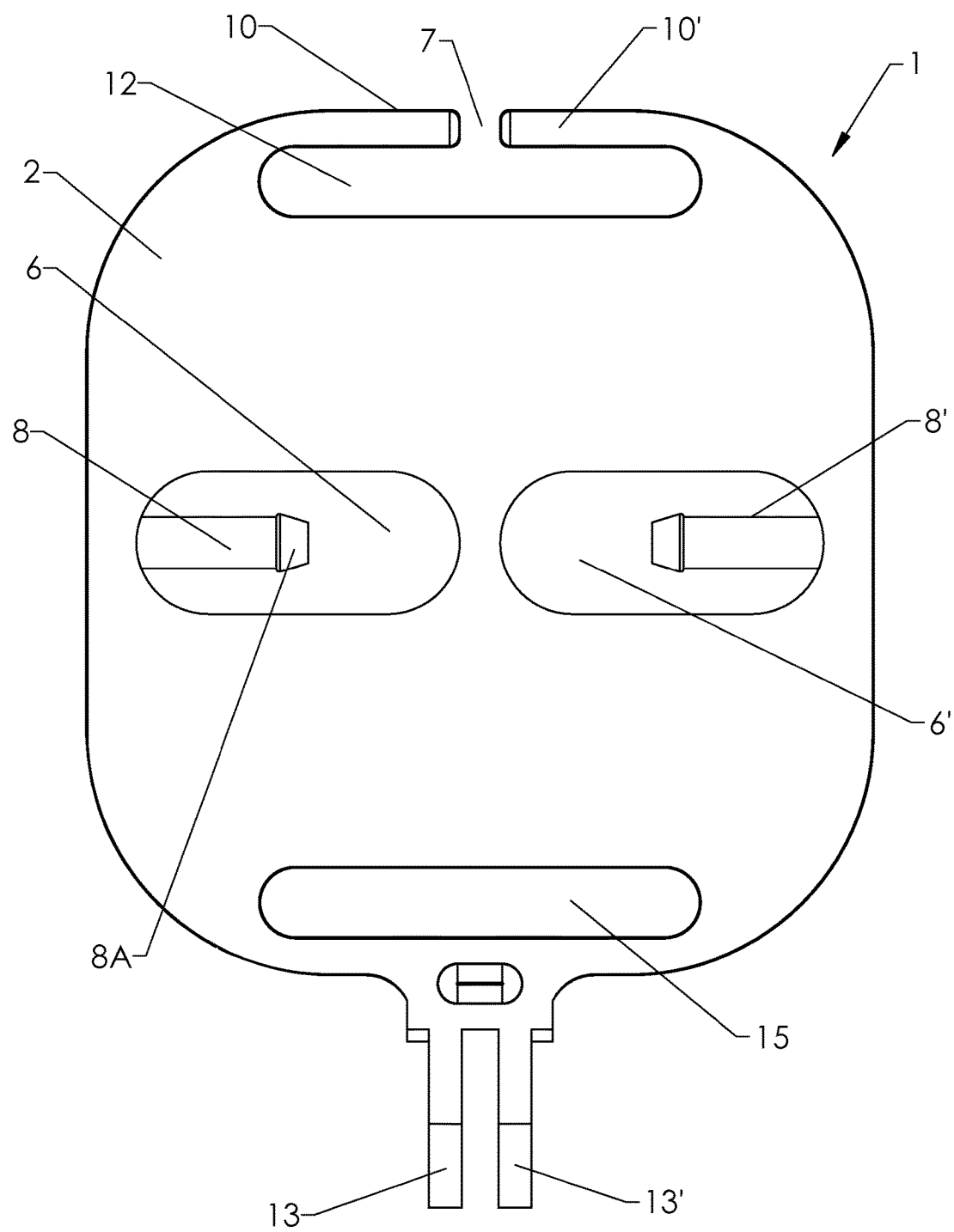
FIG. 1 is a front view of one embodiment of the invented injection molded mount apparatus, comprising multiple suction cup slots and multiple strap arms/slots.

FIG. 1 is a front view of the preferred embodiment of injection molded mounting apparatus, that is, an attachable-mounting plate 1, with a lower protruding features 13, 13' which act as the connection mechanism identified as the male connector side of a two part mounting system designed to allow attachment to the female side of a common two part mount system. This is merely one example of a variety of connector designs. In certain embodiments the plate structure is generally longer and wider than it is thick, wherein the "plate" has multiple apertures through it and so preferably does not have a continuous front surface or a continuous rear surface. This is merely one example of a variety of possible plate configuration designs. Alternative connectors could be utilized other than 13, 13' as shown. The specialty mounting plate contains an upper strap slot 12 and small opening 7 with two strap slot arms 10 and 10", which serve as the location at which to connect the proximal end of the retention strap with sewn loop. The connection (also called "insertion points" due to loop at the end of the strap being inserted between arms 10-10') between the mounting plate 2 and the elastic strap itself is created by the slot opening 12 and support arms 10-10'. The lower strap opening 15 is of sufficient width and height to allow the distal end of the retention strap to be inserted and easily pulled through. At the front face 2 of the mounting plate 1 are specialty designed suction cup slots, in an ovular shape, each having a circular opening 6 at one end, and a retention post 8 extending into the opening from the other side. The preferred retention post 8 design also includes a mushroom tip 8A, which is preferably a diameter that allow the post to be inserted into the suction cup side pilot hole, but will not be easily removed without manipulation. The preferred side pilot hole suction cup is thereby first inserted onto the mushroom tip 8A, and then pushed into the post 8 to allow the cup to then slide onto the post and be secured at the side edge of the opening, but be securely attached to the mounting plate 2, while the open suction cup side remains at the front 2.

Figure 2:
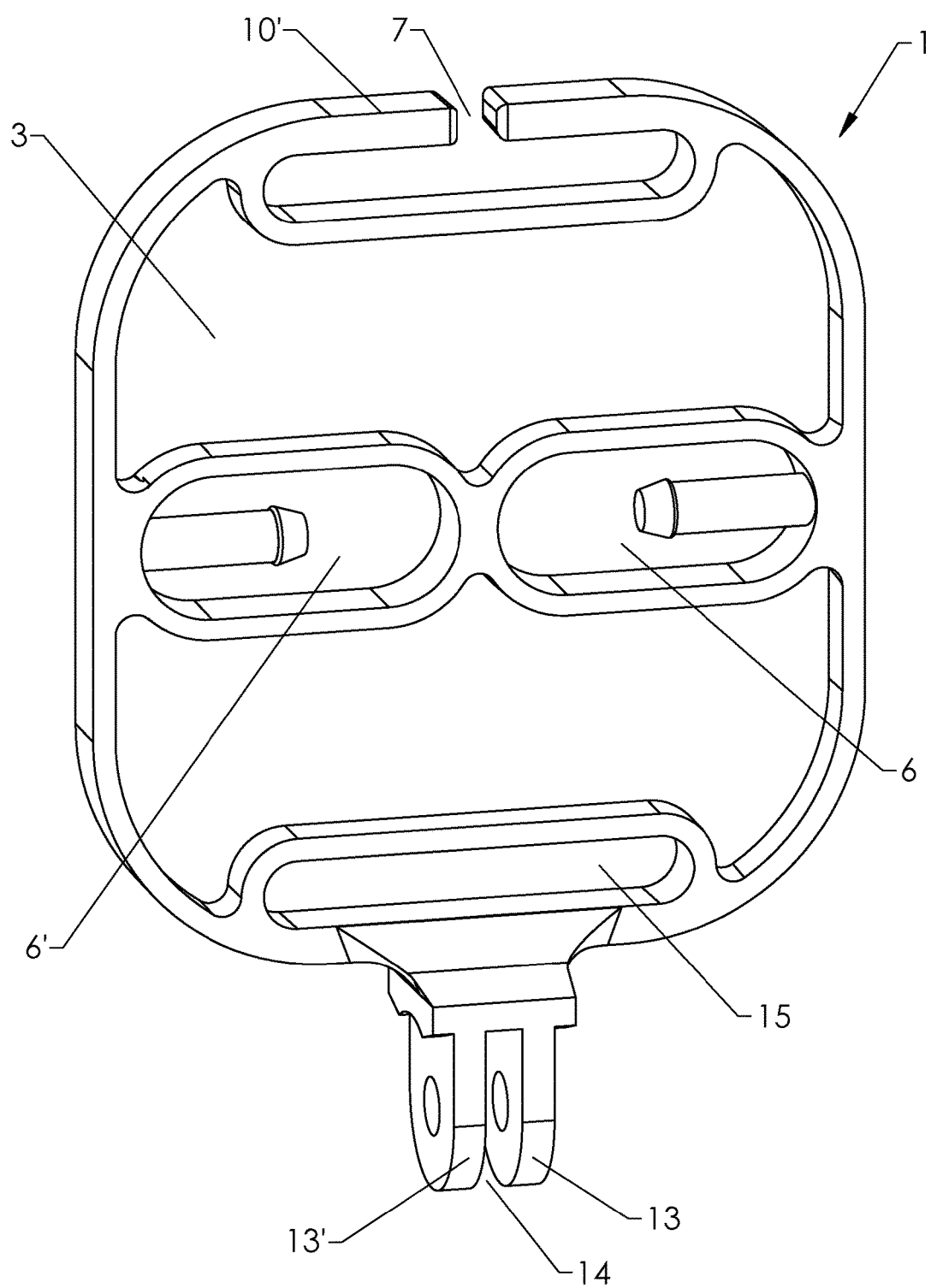
FIG. 2 is a rear view of the embodiment depicted in FIG. 1.

FIG. 2 depicts a rear view of the mounting plate depicted in FIG. 1. The same features are shown at the rear, with strap mount arms 10 and 10" at the top of the plate, creating an opening 7 at which the strap can be inserted into when connected to the mount. Proximal end of the strap 17 (not shown) comprising a loop that passes through slot 7 and around strap arms 10, 10' that are located at the upper region of the mounting plate 1. Note that arms 10, 10' extend toward each other, but do not meet, thus forming a gap 7 between their inner ends for insertion of the loop of proximal end 17. This preferred slot/arm design is intended to allow quick and easy connection and disconnection of the strap 17 to the mounting plate 1. Said connection and disconnection is performed, when desired, by manipulating the loop through the gap between the arm inner ends. The two suction cup slots 6, 6' are shown at the rear side 3 of the mounting plate which has been cored out to maintain the proper cooling during the molding process, which is common. The plate is preferred to maintain a uniform thickness at most regions of the part, to assist in the proper cooling, and to limited the level of sag or shrinkage during molding. At the lower region of the mounting plate 1 is shown the male connectors 13, 13' which extend downward, the two features create an opening 14 at which to insert the female connectors (not shown), which are identified as the other side of a common two part mounting system. These lower connection features 13, 13' contain a horizontal hole (not shown) to allow the insertion of the screw mechanism to connect the two parts (male and female) of the mounting system allowing the mount to be pivotally connected to said female portion of a two part mounting system via screw and nut mechanisms. The male protrusions each comprises an aperture which align with the identical apertures with the female side members that are pivotally connected to each other that via screw and nut mechanisms. The male protrusions 13, 13' comprise a radial end at each of said edges of the protrusion, each male protrusion comprising an identical aperture allowing an elongated screw member to extend horizontally through each aligned aperture, and wherein the mount is removably and pivotally connected the opposing female portion of the mounting system.

Figure 3:
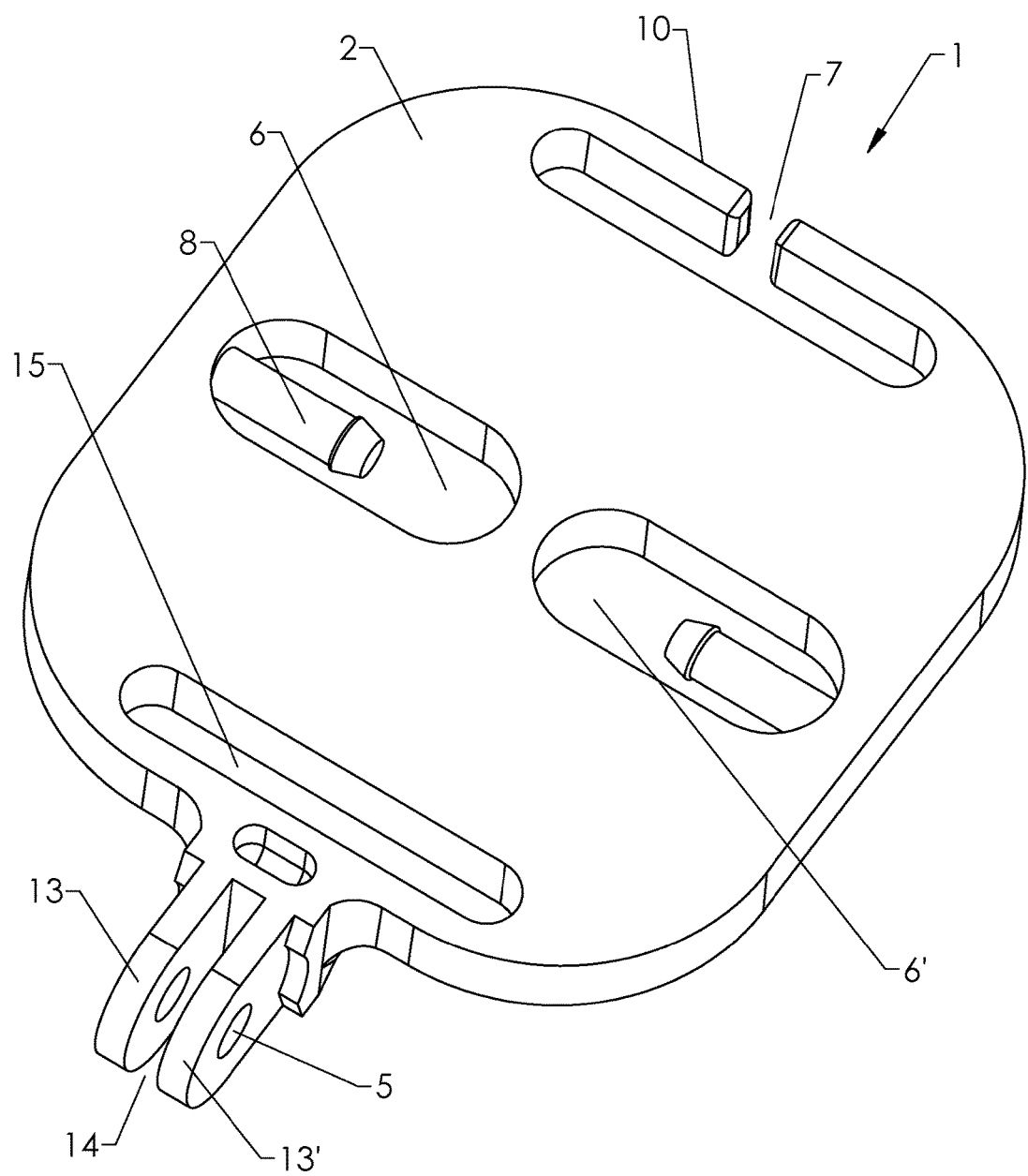
FIG. 3 is a front isometric view of the embodiment depicted in FIG. 1.

FIG. 3 is a front isometric view of FIG. 1, which shows to best advantage the preferred orientation of the suction cup slots 6 relative to the mounting plate 1. The suction cup knob is circular in shape, so the slot openings at the outer side are designed to be of a similar shape to allow the suction cups to fit tightly into slot openings 6 and onto the retention posts 8. The upper strap insertion slot contains an opening 7 which is preferably slightly wider than the thickness of the preferred elastic strap. The top strap arms 10-10' are inserted into the loop opening at the proximal end of the strap assembly to allow the strap to be removably connected to the mounting plate 1. The preferred location of the lower strap slot opening 15 is shown at the lower region of the mounting plate 1. At the lower end of the mounting plate extends outward the dual connector extension arms 13, which are preferably circular/radial at the end, aligned in a manner to allow a gap 14 which is the same width as the connection arms 13, 13'. The connection arm extensions contain a horizontally aligned aperture 5 within each feature to allow for the insertion of a screw mechanism (not shown) which connects the two parts.

Figure 4:
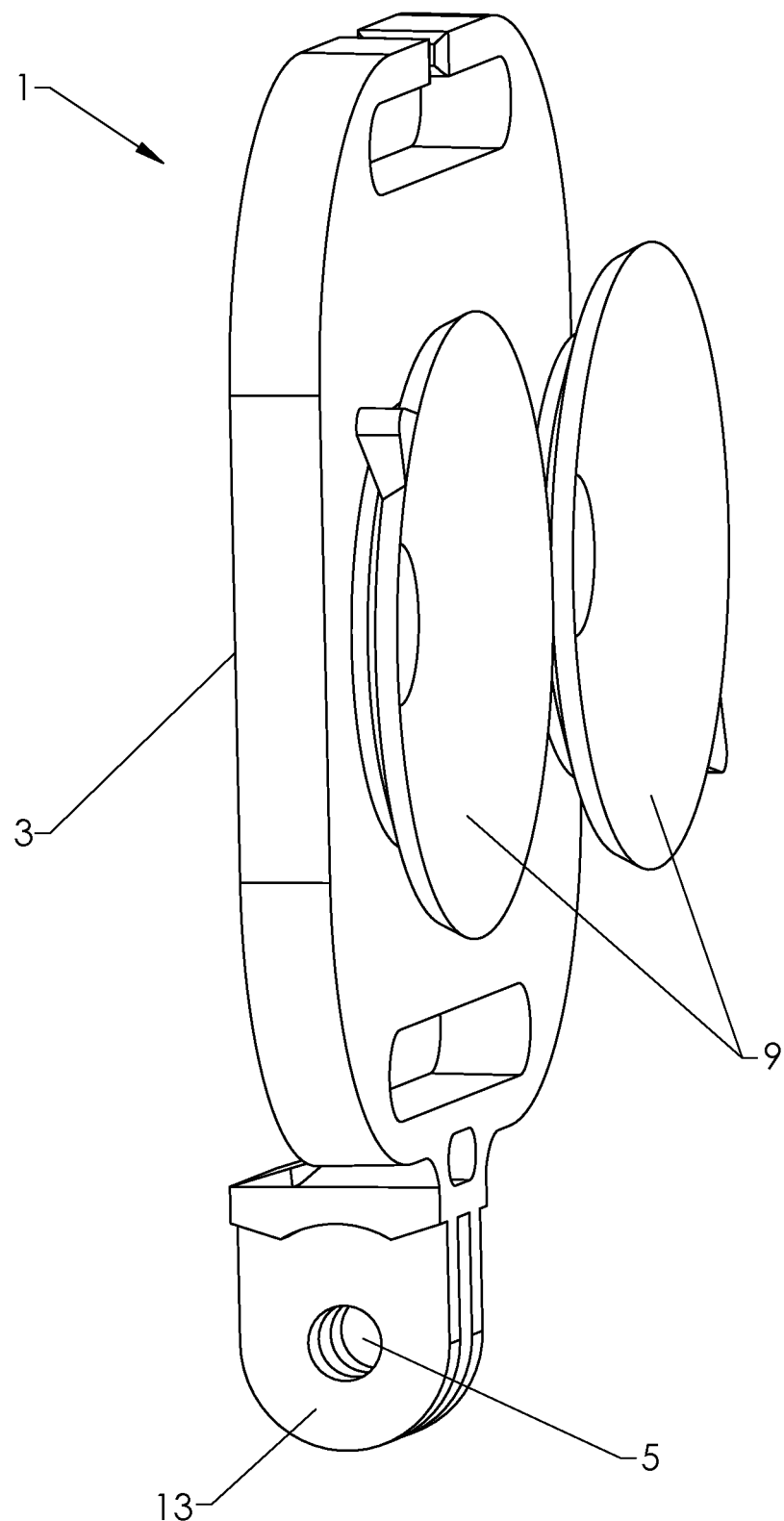
FIG. 4 is a left side isometric view of the embodiment of FIG. 1, also showing the location of two suction cup mechanisms when inserted into the slots.

FIG. 4 illustrates a side view of the mounting plate 1 illustrating the preferred location and size of the front facing suction cups 9, and preferred shape of the male connector 13 at the lower end of the mount 1. The side pilot hole suction cup(s) 9 are shown as being inserted into the slots at the front face of the mount 1. The design and locations of the slots within the mounting plate 1 are preferred to create at least some space between the cups so as to minimize and interaction between the cups, which would likely render them inoperable.

Figure 5:
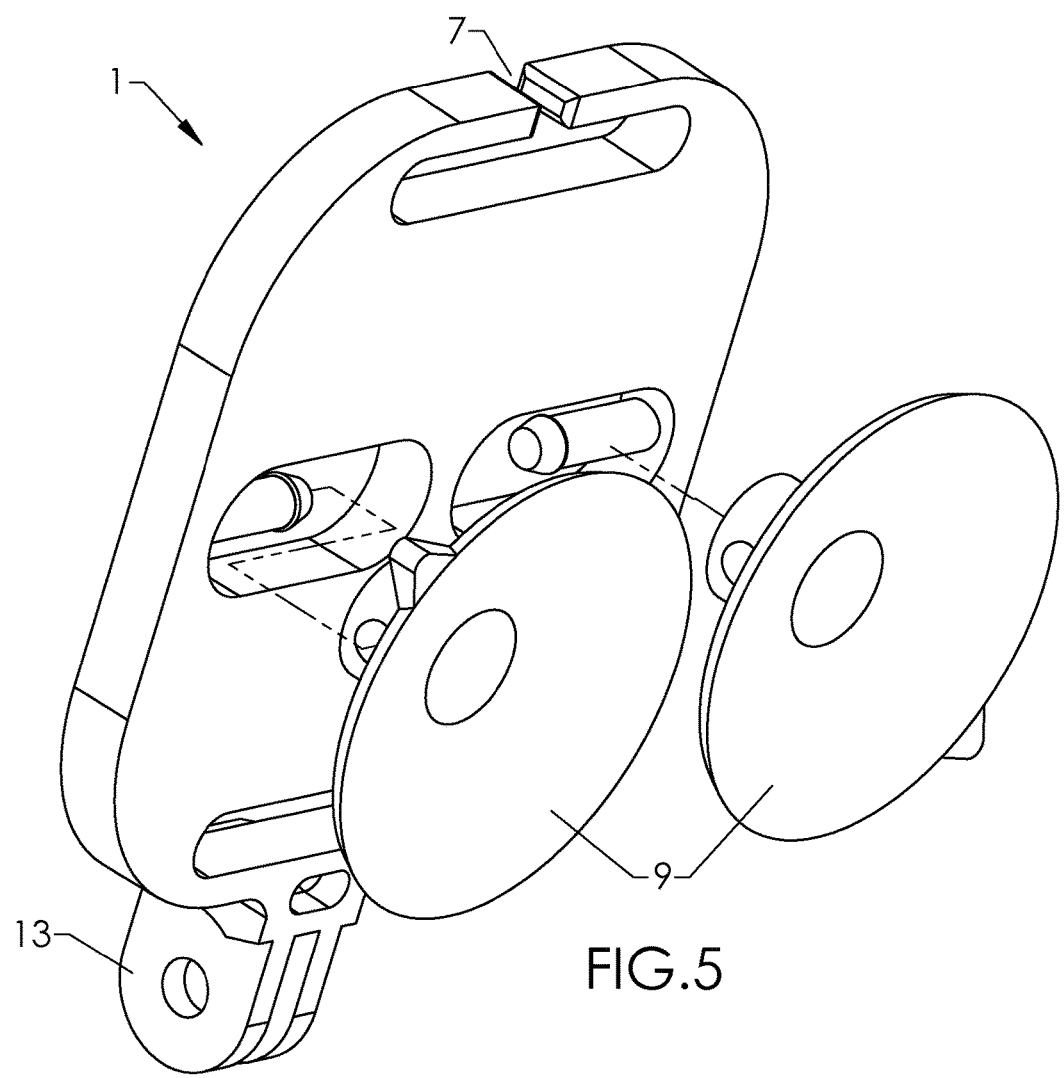
FIG. 5 is an orthogonal view of the embodiment of FIG. 1, with suction cups removed from slots aligned in their preferred orientation.
Figure 5A:
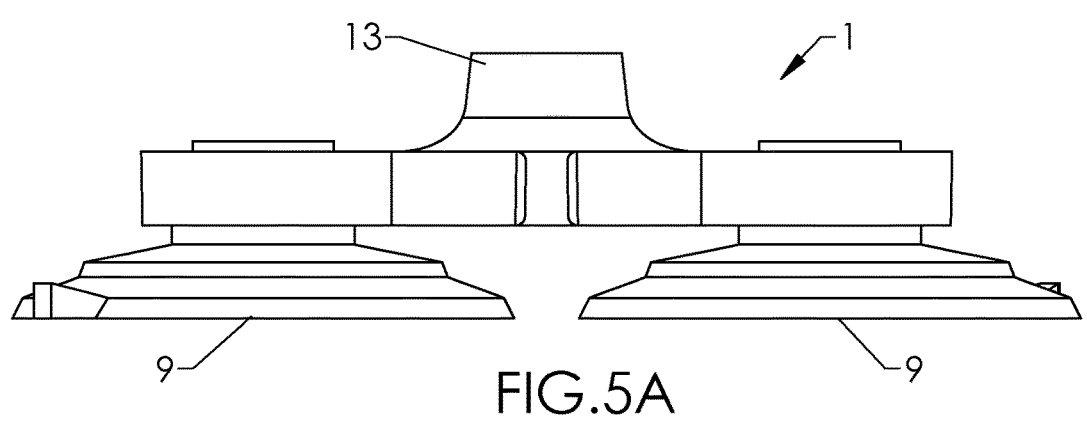
FIG. 5A is a top view of the molded part portrayed in embodiment of FIG. 5.

FIG. 5 illustrates a front isometric view of the mounting plate, showing the relative size of the upper slot opening 7 and preferred shape of the lower male connector 13 that are located on the lower end of the mounting plate. The side pilot hole suction cups 9 are shown aligned with the slots at the front of the mount in their preferred orientation, but are not inserted. FIG. 5A is a top view of the mount, illustrating the preferred location of the cups 9 when they are correctly inserted into the slot openings at the front side of the mount. This shows to best advantage the preferred gap between the suction cups 9 while attached to the mount. This preferred thickness and shape of the male connectors 13 are also shown, depicting the relative size compared to the thickness to the upper portions of the mounting plate.

Figure 6:
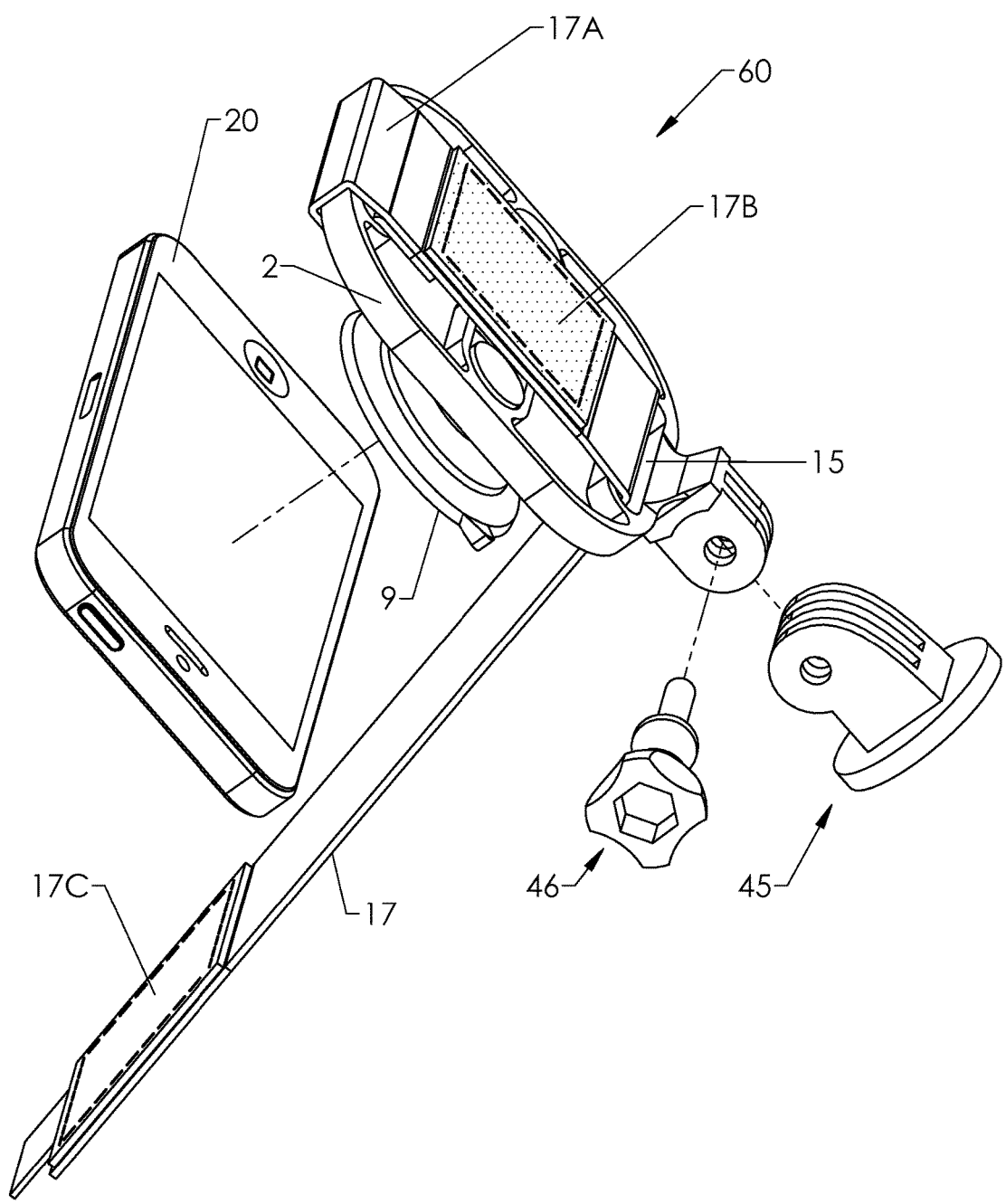
FIG. 6 is a rear orthogonal view of the molded part portrayed in embodiment of FIG. 4, wherein this figure demonstrates the preferred orientation of the mounting plate assembly relative to the attachment mount coupler (below) and screw mechanism, also depicting the orientation of a smartphone device and retention strap.

FIG. 6 illustrates a rear/side view of the mount illustrating the preferred orientation between the mounting plate and the electronic device 20, but not yet attached at the front of the mount with elastic retention strap 17 being outstretched in from of the mount 2. A loop 17-A at one end of the retention strap 17 is attached to the top-strap arms 10, 10'(not shown), which are located at the upper region of the mounting plate 2. The strap is extended through loop opening 15 within the lower region of the mounting plate. The preferred elastic retention strap includes a patch of hook-loop fastener 17-C which is sewn in place on the upwards facing side of the distal end of the strap to allow for connection with rear facing patch of hook/loop fastener 17-B, best shown to be fastened in FIG. 7 at 17-B. The various components are shown expanded in FIG. 6, with mount 2 in the preferred orientation to be aligned with the opposing female connector and screw mechanism.

Figure 7:
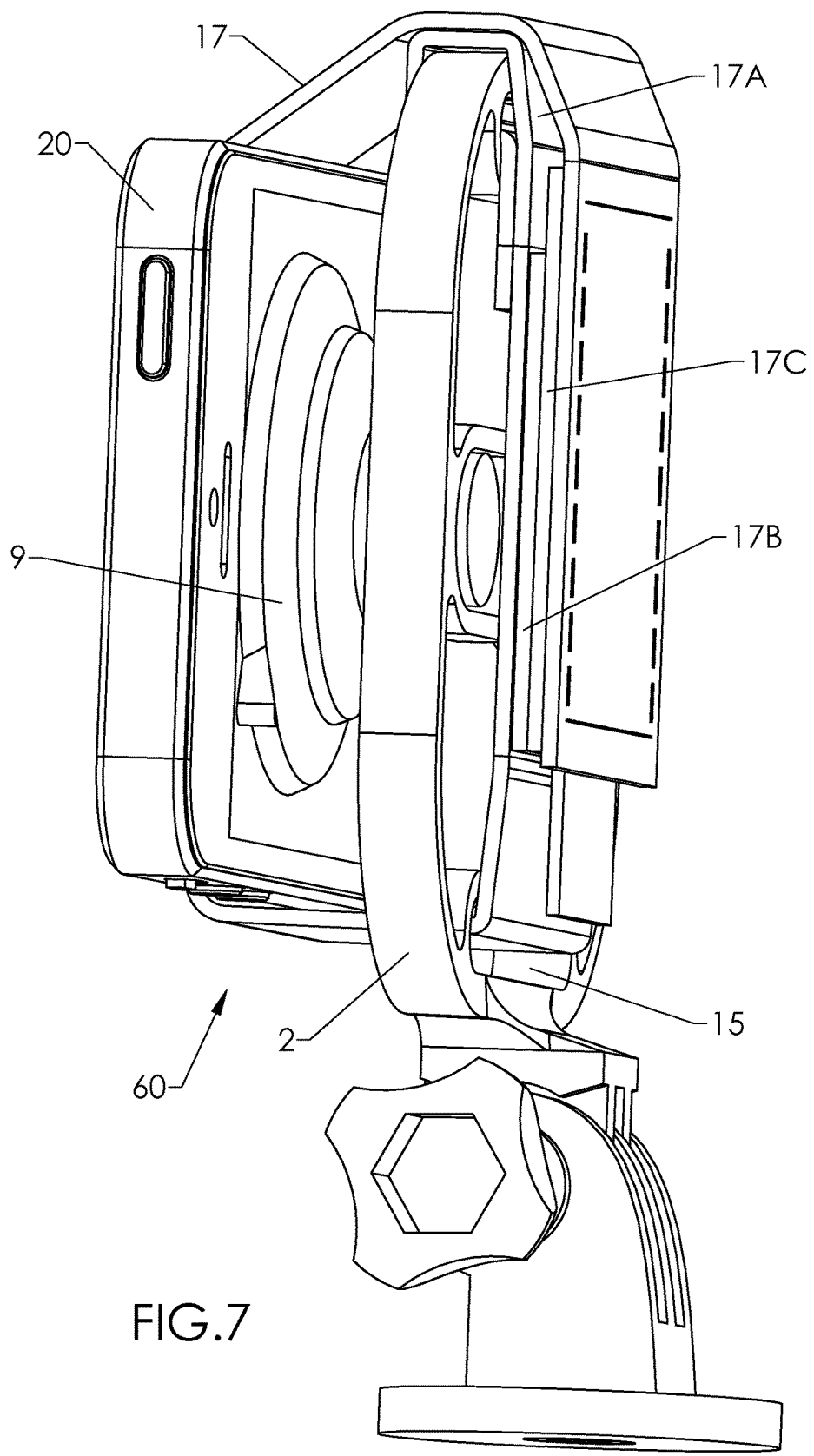
FIG. 7 is a side view of the embodiment of FIG. 6 depicting the smartphone device held in place via suction cups with retention strap also secured around the device to demonstrate the preferred orientation of the mount relative to the device, while secured within the mount coupler via screw mechanism.
Figure 8:
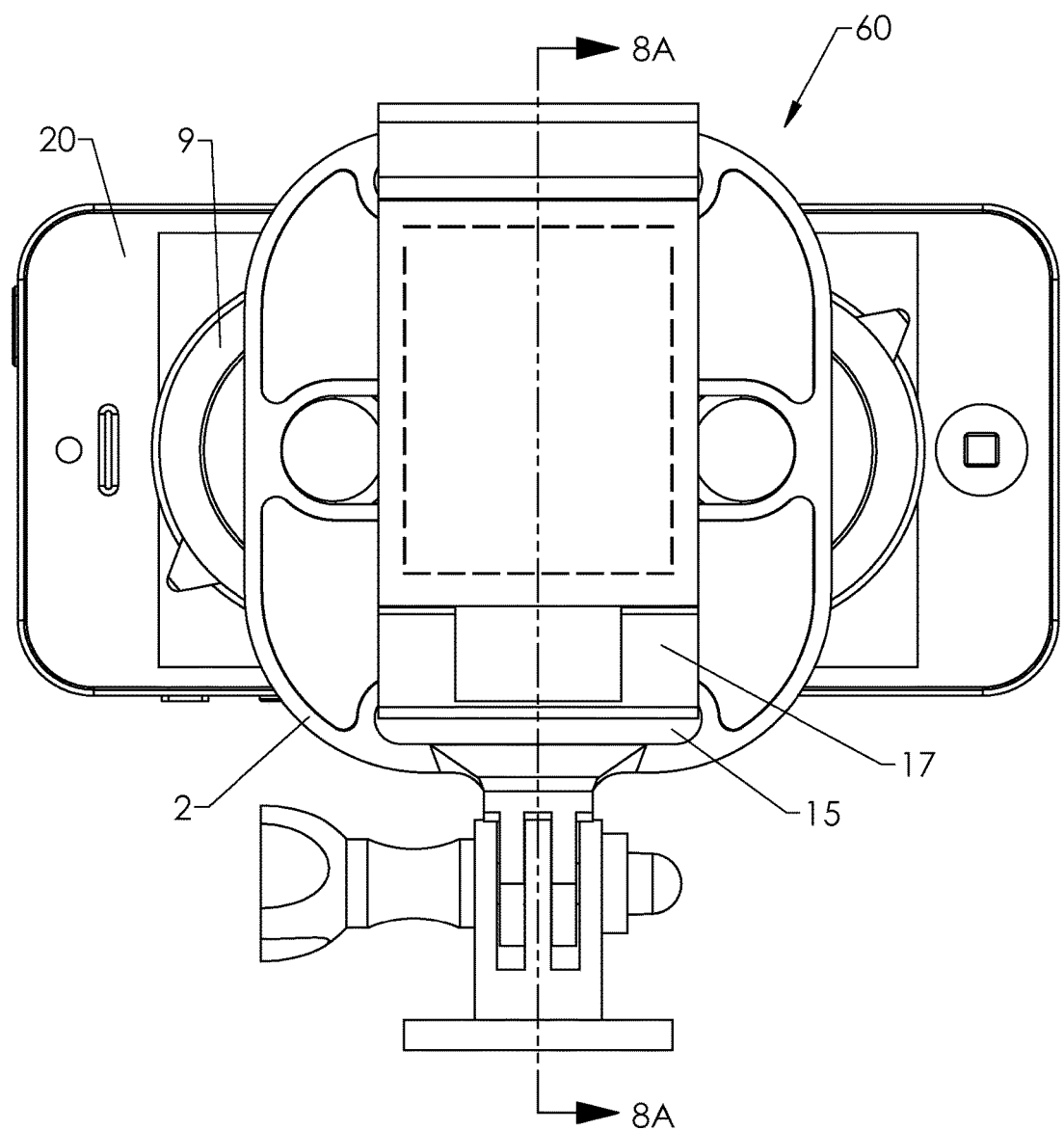
FIG. 8 is a rear view of the embodiment of FIG. 7.

FIG. 7 is a side isometric view, which illustrates the various components shown in FIG. 6 when all parts are connected in the preferred orientations. The preferred orientation of the elastic retention strap 17 as it is wrapped around the electronic device 20. See also FIG. 9. As shown to best advantage in FIGS. 6 and 7, the proximal end of the retention strap 17 loops around arms 10, 10', thereafter the distal end extends through slot 15, upwards and around the device 20, to connect the facing hook/loop patch of fastener 17-C to the corresponding patch of fastener 17-B exposed at the rear of the mount. The preferred attachment locations of the front facing suction cups 9 are clearly shown as vacuum sealed to the facing glass screen of the electronic device 20.

FIG. 8 illustrates a rear view of the mount as was shown in FIG. 7 illustrating the preferred orientation between the mounting plate and the electronic device 20 when secured at the front of the mount with elastic retention strap 17 fully encircling the device 20, which is attached via suction cups 9. The preferred orientation is in landscape, with the camera lens (not shown) of the device directed forward. The device can optionally be shifted to the left or right within the mount under a scenario where a particular device has operational buttons along the side location of the device where the strap 17 may inadvertently interact with the buttons. The device can be securely held within the mount even if slightly shifted to one side or the other.

Figure 8A:
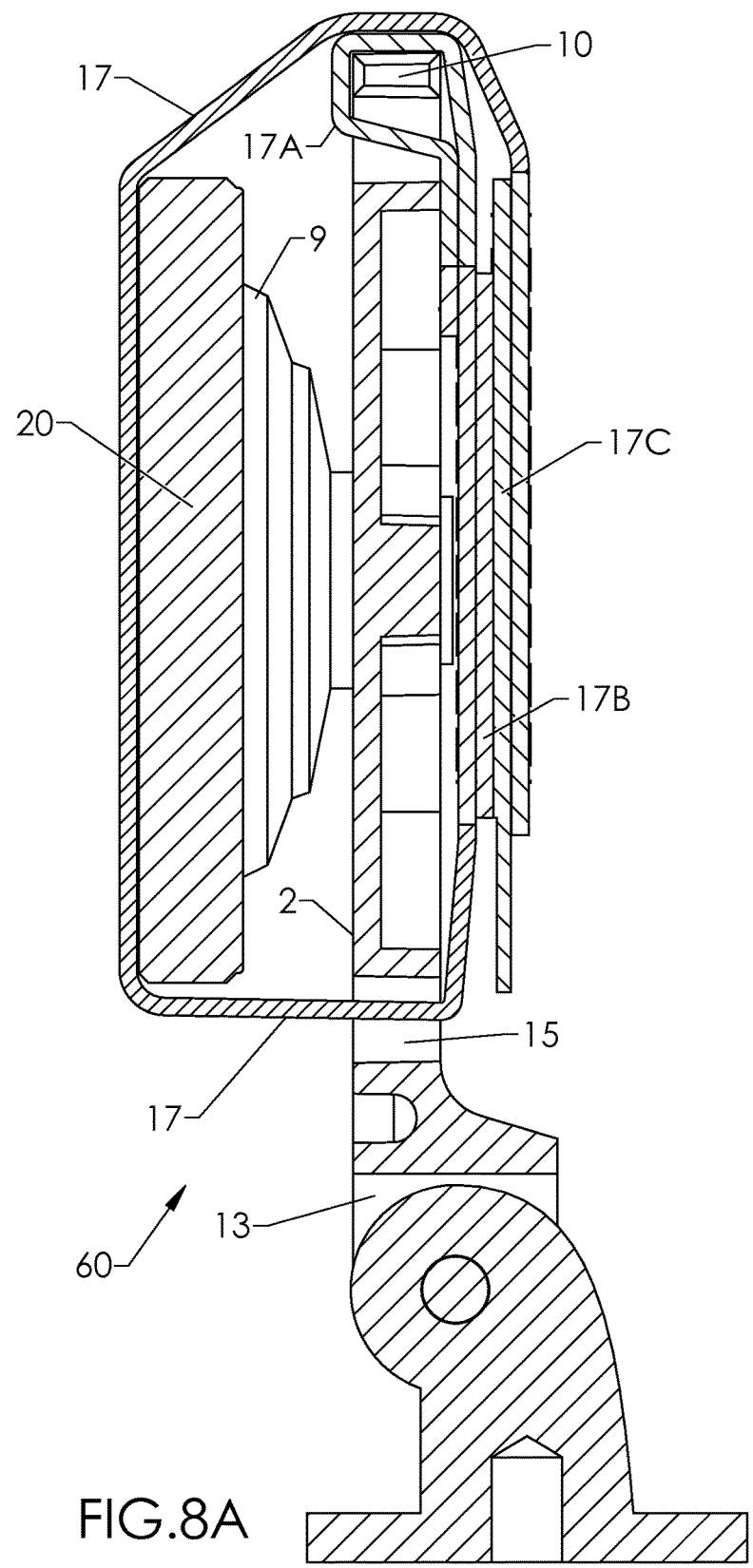
FIG. 8A is a side cross sectional view along the line (8A-8A) in FIG. 8.

FIG. 8A is a side cross sectional view along the line (8A-8A) in FIG. 8 depicting the preferred alignment of the device 20 relative to the mounting plate 2, with suction cups 9 securely affixed to the screen of the device. The retention strap 17 is shown as connected to strap arms 10 via loop opening 17A, extended through slot opening 15, and fully encircled around the device 20. The hook and loop fasteners are clearly shown here by 17C and 17B in their preferred connection orientation. The strap 17 is pulled tightly, and stretched, putting a force onto the strap at the rear thereby requiring a strong fastener connection, amply supplied by the patches of hook and loop material. The force of the strap 17 helps to maintain the vacuum connection between the suction cups 9 and the electronic device 20 due to the force encircling the mount and device together as a result of the elastic qualities of the strap 17.

Figure 9:
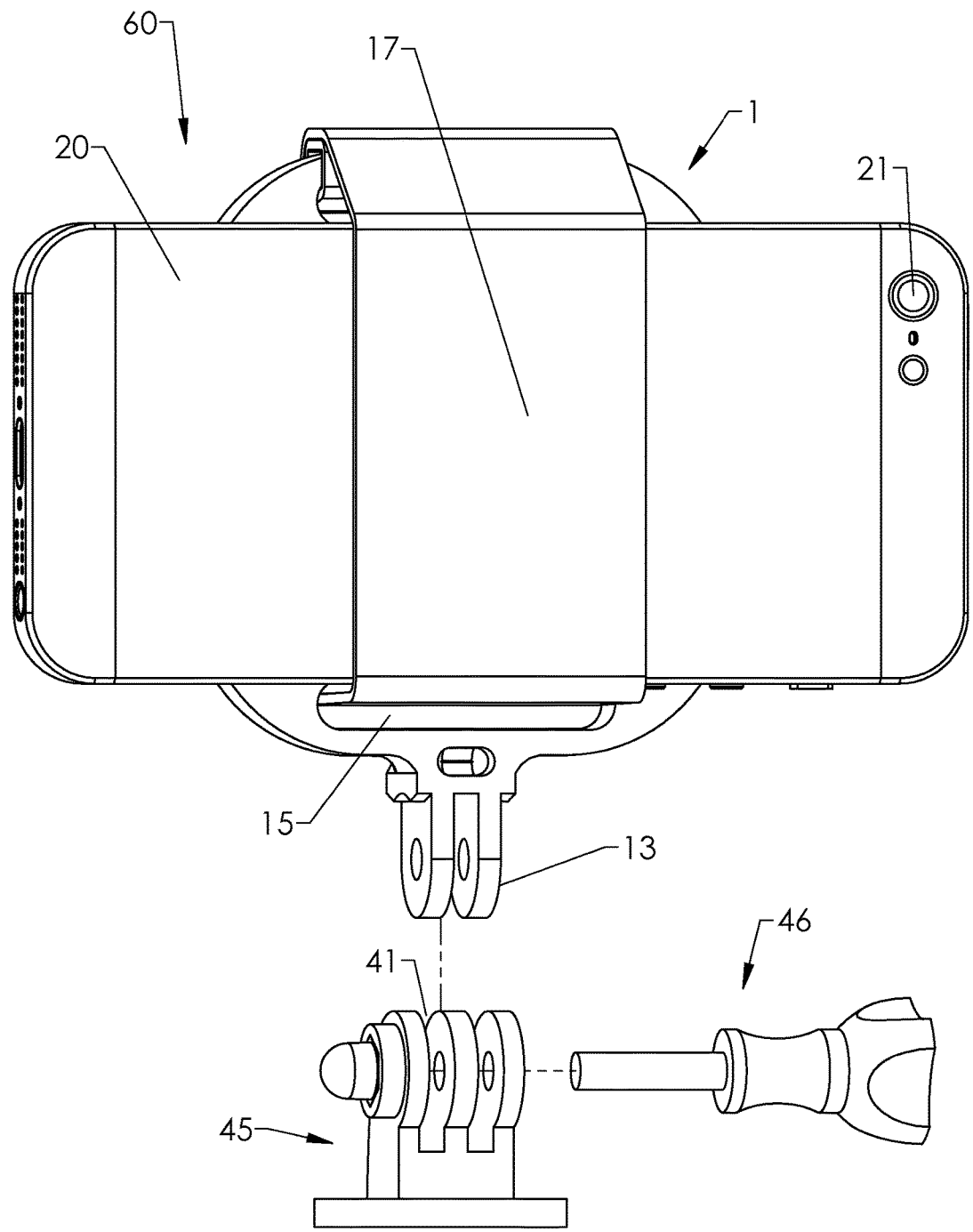
FIG. 9 is a front view of the molded part portrayed in embodiment of FIG. 6, wherein this figure demonstrates the preferred orientation of the smartphone device and secured retention strap relative to the attachment mount coupler (below) and screw mechanism.

FIG. 9 illustrates a front view of the mount as was shown in FIG. 1 illustrating the preferred orientation between the mounting plate 1 and the electronic device 20 when attached at the front of the mount with elastic retention strap 17 fully encircling the device 20, which is secured to the mounting plate 1. The preferred orientation is in landscape, with the camera lens 21 of the device directed forward. The device can optionally be shifted to the left or right within the mount under a scenario where a particular device has operational buttons along the side location of the device where the strap may inadvertently interact with the buttons. The male connectors 13 at the lower end of the mount preferably align in parallel to allow for insertion into the female side 45 of the two part mount system, which are then connected by a screw mechanism 46. This two part mount system relies on male connectors 13 which are appropriately sized to fit within the gap openings 41 in the female side 45, and the parallel holes 5 (not clearly shown) are aligned horizontally to allow the screw mechanism 46 to be easily inserted therein and held in place with nut. This common screw and nut mechanism effectively tightens the male and female portions together, allowing them to be pivotably connected, but can thereby restrict the mounting plate 1 from rotating when sufficiently tightened. The mount 1 can be attached to either a mount affixed to an object, or to a wearable mounting apparatus designed to be worn by a person. Wearable body mounts have become commonplace, allowing specialty recording devices to be attached at various locations on the human body, such as a head, chest, wrist, hand, or leg. For example, many such mounts are manufactured and sold by GoPro™.

Figure 10:
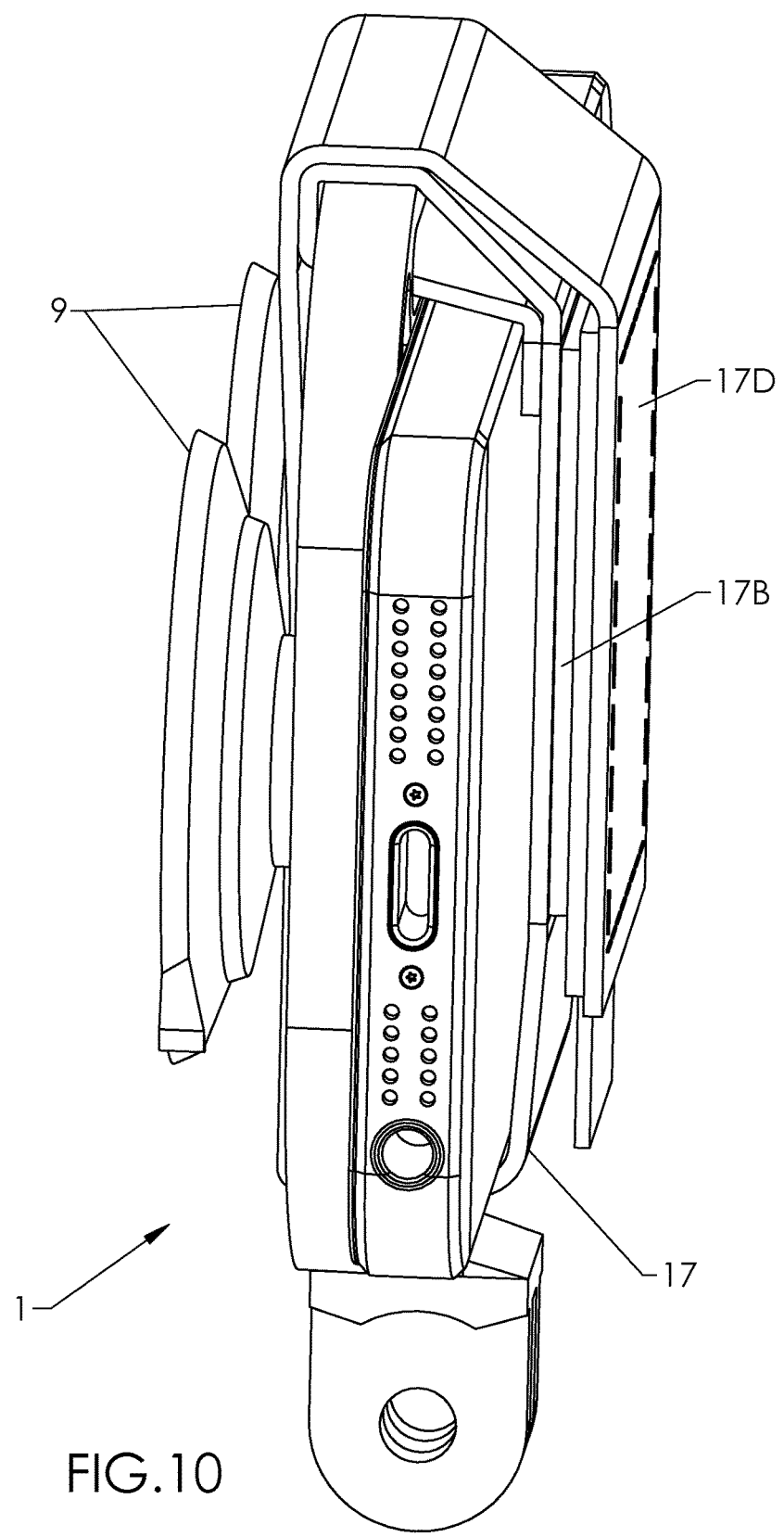
FIG. 10 is a side view of the molded part portrayed in embodiment of FIG. 9, wherein this figure demonstrates the alternative orientation of the retention strap with electronic device strapped into place at the rear side of the mount and suction cups facing forward at the front, to allow for attachment to a smooth surface.

FIG. 10 depicts the alternative orientation and use of the invented device. In this alternative configuration, the elastic retention strap 17 is extended through the slot opening 15 (not clearly shown) and then between the two front facing suction cups 9, and then over the top of the mount, to be attached back upon itself. Once the strap is inserted though the lower gap and extended between the cups, the electronic device is inserted into the space between the mount and the strap 17. The electronic device 20 is inserted into the space between the rear face of the mounting platform and the inner rear portion of the retention strap 17 so that the device 20 is centrally aligned with the mounting plate, with device 20 in a landscape orientation. In other words, the vertical centerline of device 20 is preferably aligned and parallel to the vertical centerline of the mounting plate. The distal end with facing hook/loop fastener 17-D, is extended through the slot opening, over and around the top of the mount to connect with the outwards facing patch of hook/loop fastener 17-B to provide a tight fit of the strap 17 around the device 20. Thus, strap 17 may be pulled tight and secured generally in the position shown in FIG. 10, which pushes the device 20 against the mounting plate also held in place by the facing silicone material which preferably exists on the strap, aligned adjacent to the surface of the device. The length of the retention strap 17 is intended to be of sufficient length to accommodate larger devices that have a longer width dimension due to the elastic qualities of the strap and the size of the patches of hook fastener that has been specifically lengthened to ensure sufficient surface area to accommodate these larger devices. This alternative orientation leaves the front facing suction cups 9 available to allow for connection onto a smooth vertical surface. The camera lens of the device 20 is oriented to the rear, to allow for unobstructed view while the device is attached to a smooth vertical surface. This alternative orientation can optionally be utilized without being connected to the female connector mount, thereby allowing the mount and device to be secured to a smooth surface while recording video or taking pictures by use of timer, time lapse, or blue tooth remote.

FIG. 11 illustrates an isometric view of the elastic retention strap 17, with the various sewn on components of the apparatus. At the proximal end 17-A is sewn in place a loop, which acts as the connection point for the strap 17 and the mounting plate. The size of the loop is preferably larger than the diameter of the slot arms 10, 10'. When the proximal end of the retention strap 17 is connected correctly, the proximal patch of hook fastener 17-B sewn in place at or near the proximal end is exposed, that is, facing out to the rear. The strap 17 also includes a patch of hook/loop fastener sewn in place at the distal end of the strap, identified as 17-C. The elastic strap could optionally be provided with silicone material or other gripping material, to create the desired "grippy" connection between the inner portion of the strap and the device 20. The patch of fastener at 17-C connects with 17-B when an electronic device is attached to the front of the mount at the suction cups. With the alternative configuration where the device is placed at the rear of the mount, on top of the lower strap support arm, the same side of the strap with sewn on patch of hook/loop fastener 17-C still then connect with 17-B. Thus, the design accommodates either orientation, which thereby allows for a strap connection in both the primary and alternative configurations associated with intended use(s) of the invented device. FIGS. 6 and 7 show the intended orientation and function of the elastic retention strap 17.

FIGS. 12 and 13 illustrate the preferred suction cup 9 design that is intended to be used with the unique mounting plate assembly. The preferred suction cup is identified as a "side pilot hole" style of cup. This cup contains a knob and cup. The preferred suction cup 9 contains a knob 25, just above the cup portion. The knob 25 includes a side pilot hole 26, and release tab 27. The release tab 27 is designed to be pulled up, thereby releasing the vacuum connection between the cup and smooth surface. The hole thickness corresponds to the retention post within the mount. The relative diameter of the cup 9 portion is considered to be medium, approximately 1.5" inches in diameter, which is generally a shorter distance than the typical width of the screen of the preferred device. The screen of the typical smartphone is of a size and width that will allow for two of these medium sized suction cups to be attached to the screen at one time. The size is generally too large to allow for three cups to be attached simultaneously to the screen. This style of suction cup is readily available in commerce, sold by domestic manufacturers specializing in suction cups.

FIG. 14 illustrates the preferred female connector design 45 of the two part mounting system. This female portion 45 is a mount which preferably includes three upward protrusions 42 that create two gap openings 41 which serve as a logical location to insert the male connectors 13, 13' that exist on the invented mounting plate to allow for connection of the two parts. This female mount 45 contains horizontal apertures, which are of the same diameter as the apertures 5 that exist in the invented mounting plate within the male connectors. At the side of the mount 45 preferably exists a nut 40, which is held in place aligned with the holes. This design allows for the invented mount to be inserted into the gap openings 41, the holes to aligning thereby allowing the end of the screw mechanism 43 to be inserted into the holes and tightly fastened with the rotating knob 44 to create a tight hold between the two part mount system. This preferred screw mechanism 46 includes a threaded screw portion 43, and rotating knob 44 which work in unison to allow the screw to be tightened into the nut 40 on the opposing side of the mount 45. This is a common mount system that already exists, and is used for a variety of products to create a tight connection, which is also adjustable in rotation from front to back. The invented mounting plate thereby leverages previously existing mounting systems to allow for operation with such systems that already existing in the market and are considered common. This is only one connector design shown, as there are a variety of alternative connector designs and options that could be utilized with the invented mounting apparatus.

FIG. 15 illustrates an alternative suction cup slot design and slot orientation that could also be included in the mounting plate assembly. FIG. 15 depicts the previously shown mount design in FIG. 1, but illustrates the optionally included mini suction cup slots 36, which would therefore allow an alternative style of cup to be operated with the mount. Each aperture 36, an elongated insertion-portion 37 and a retention-portion 38. The bases of the second set of suction cups are first received loosely in the elongated insertion-portions 37 and then slid sideways into, and held tightly in, the retention-portions 38. This design would not allow for both styles of cups to be utilized at the same time, but rather one style of cup or another. This FIG. 15 depicts the flexibility for optionally including additional suction cup slots that may be useful for specific devices, but still achieves the same desired effect, to securely retain the device within the mount. The remainder of the design features would preferably remain the same as shown. This combination of retention methods via suction cups and a strap affecting the device is therefore unique and has not be previously been observed in any wearable electronic device mounting designs.

FIGS. 16 and 17 illustrate the alternative suction cup 32 design that could also be operated with the unique mounting plate assembly. The alternative suction cup is identified as a "mini thick neck mushroom head" style of cup. The alternative suction cup 32 contains a thick neck 28, just below the mushroom head 29. The thickness and diameter of the neck portion 28 is a necessary dimension to note as it is the same relative dimension as the size and thickness of the alternative suction cup slots 36 as previously best shown in FIG. 15. The relative diameter of the cup 32 portion is commonly referred to a mini size, due to the size smaller than 1 inch in diameter. Due to the size of this cup relative to the typical screen size, more than 2 cups can be attached to the screen at one time. This style of suction cup is readily available in commerce, sold by domestic manufacturers specializing in suction cups.

One should note with varying designs of smartphone devices, the operational buttons are often located along the side edges of the device. Such buttons are often utilized for functional features associated with the device such as camera zoom, on/off, or other functions. As such, it is preferred that these buttons are not compressed during video recording. Such compressing interactions with the retention strap or other portions of the mounting plate assembly could result in undesirable consequences, such as unwanted zoom, or accidentally turning the device off during use, thereby limiting the ability of the user to successfully record video. The preferred orientation of the device 20 held on the suction cups therefore ensures that resting and tightening the device 20 in the mounting plate, does not compress the buttons, as the device can be shifted to one side or another, rather than be centrally located within the mounting apparatus.

The retention strap 17 may range from very flexible (such as cloth, elastic, thin rubber band, etc) to only somewhat flexible as required for various electronic devices. One side of the retention strap can optionally include a silicone or other gripping material, for gripping the device 20.

FIGS. 1-2 illustrate details of the mounting plate 2. Generally rectangular main body has a cored-out rear surface 3, which is desirable for polymeric ("plastic") injection molding techniques to aid in the proper cooling of the molded part. This is very common for plastic molded parts, and therefore these cored out cavities do not serve any specialized functional purpose. In certain embodiments the plate structure is generally longer and wider than it is thick, wherein the "plate" has multiple apertures through it and so preferably does not have a continuous front surface or a continuous rear surface.

General Descriptions of Preferred Features of Certain Embodiments

It has become commonplace that a high percentage of citizens of nearly all ages own a modern day smartphone and carry it on their person on a day to day basis. Thus, the modern day smartphone has become the most common electronic device known to be carried by a high percentage of the population. Often a person may desire to record video while performing stunts, tricks, talents, or day to day activities to capture the event on video, thus creating an action video. There are a variety of action cameras and mounting systems available in the marketplace to accomplish this task, however, the recording devices are relatively expensive and are therefore not available to those without the financial wherewithal to purchase such items. In turn, the modern day smartphone is the most convenient device that would be expected to be a logical alternative that could be used for such video recording purposes. However, there is a lack of mounting options that securely hold the device in place while the device is in high speed motion. The need arises for a universal smartphone mount that is operable with pre-existing mounting systems to allow users to operate this smartphone mount (male) with the corresponding fixed mount designs (female) that are common in the market. The complete mounting system contains two parts which couple together to complete the mounting system. For description purposes, the specialty smartphone mounting portion of the system is identified as the male side while the other portion of the system which is typically fixed in place is identified as the female portion, therefore allowing the two parts to be coupled together by a screw mechanism which then locks them into place.

Specialty video recording devices do not often fit into a pocket or purse, and are not often carried on a day to day basis by a typical person. The preferred mount design effectively creates more convenience due to the fact that smartphones are being carried by such a high percentage of the population. Additionally, the mount can be easily carried on one's person, in a coat pocket, purse, back pack or other means, due to the small lightweight nature of the design and associated materials. Additional convenience is created by the fact that the mounting apparatus will work with a high percentage of smartphone designs, thereby allowing the user to operate the device with their current smartphone model, or a different model that they may obtain in the future.

By their nature, camera devices (especially portable electronic devices with video functions) are meant to be utilized by an individual taking pictures and video of events, celebrations, stunts, tricks, action sports, or day to day activities. A problem arises when an individual desires to record video with a smartphone device but the nature of the action contains a high risk of the device being dropped, or falling out of a mounting device. This situation often occurs with portable devices, such as wireless or cellular telephones with video recording functions, where a user simply holds onto the device with one or two hands during the action and is at risk of dropping the device. As a result, users often employ the use of a case or mounting device which can protect the device in the case of accidental drop or fall. These mounts and protective cases are offered in the marketplace. There are a variety of specialty action video recording devices and mounting systems in the market. However, transporting a specialty video recording device and the necessary accessories for such uses can be challenging, creating issues for convenience and storage of such apparatuses. As such, there arises a need for a universal mount that is operable with a high percentage of modern day smartphones, which can also be operated/coupled with existing mounting systems to allow action video recording.

The inventor has created an effective way of mounting a smartphone or other video-capable electronic device onto a unique suction cup enabled mount to securely hold the device in place while recording, also allowing for the additional (alternative use) function of mounting to a smooth vertical surface for hand-free uses associated with taking pictures and video. The invented mounting apparatus is operable with existing mounting systems that are common in the market.

The retention strap assembly may be conveniently constructed from conventional materials by conventional sewing and/or adhesive techniques. Preferably, the suction cups, elastic retention strap and hook/loop fasteners are of good quality to obtain the desired effect, all existing materials being readily available through traditional sourcing methods. The intention of the mounting plate design is to provide a customized mechanism to serve the intended purposed for the invention. This is a custom injection molded item for which a mold can be created, and thus the desired part can then be manufactured from the mold. The mounting plate may be of a different size compared to those shown in the drawings, for example, different strap arms/slots can be utilized to accommodate different sizes and thicknesses of straps. The materials making up the retention strap may be elastic webbing material, for example, or other materials such as leather, rubber, specialty elastics, grippy silicone elastic, and/or specialty materials for specific devices or economy reasons. It may be said that the mounting plate may include "at least one" suction cup. While it is preferred that the mounting plate is provided multiple suction cup slots as shown, some less-preferred embodiments may simply provide some lesser quantity.

Additionally, while the preferred retention strap contains patches of hook and loop fastener, an alternative design would be to utilized alternative fastening connections such as snaps, adhesives, or buckles.

The preferred mounting plate, retention strap, and suction cups described herein provides a unique attachment option while holding the device in conjunction with an electronic device in landscape orientation, thus, allowing the holder's to securely attach the mount and device to common mounting systems for recording action video. The device's ability to function with a broad spectrum of devices is accomplished in certain embodiments at least in part because the design features and specific dimensions and physical characteristics of the apparatus. There is some leeway in the overall length and width of the mounting plate; even with this leeway and variation, the apparatus will still be able to generally secure an electronic device to the apparatus with the suction cups and strap to allow the holder to record video while the electronic device is securely retained within the device when the apparatus is attached to the female portion of the mounting system. Alternative connectors could also be employed. Preferably, the retention strap arms are located at the top of the mounting plate to ensure that the strap can extend along the rear of the mount and extend through the lower slot opening and extend upward around the device. Also, adaptations may be made in certain embodiments in the level of forward tilt, or lack thereof, used for the attached mounting plate that is used to capture the desired field of view. The lower extended male connector arms with apertures that attach to the corresponding female side of the mount attached on the fixed side of the mounting system via screw mechanism has been designed to allow for adjustability in rotation, thereby resulting in a broader spectrum of field of view for the user if so desired by rotating the mount and tightening the screw in place.

From this description and the drawings, one may understand that the screen of the electronic device, or back side if sufficiently smooth to achieve vacuum suction, may be easily placed onto the forward facing suction cups and then the lower retention strap is extended through the lower strap slot and wrapped around the device and the mounting plate allowing the device to be securely retained there to achieve landscape orientation for action video recording while used in a complete mounting system. Thus, the device is a convenient and economical apparatus for securing an electronic device to a mount which can then be attached to the female side of a mount to provide a secure mounting system for action video recording. It is especially beneficial for those taking video with a smartphone, or some other type of electronic device with video capabilities whereby the apparatus ensures that the device will be retained within the mount while recording video.

The invention contains a mounting apparatus for an electronic device with video recording capability, the mounting apparatus consisting essentially of: a mounting platform having a generally vertical front surface and a rear surface; at least one set of suction cups, wherein the mounting platform comprises at least one set of apertures adapted to receive and removably retain base portions of said at least one set of suction cups to removably connect the suction cups to the mounting platform with cup portions of the suction cups extending forward out away from the front surface of the mounting platform; a retention strap connected to the mounting platform, wherein a first portion of the retention strap extends along the rear surface of the mounting platform, a second portion of the retention strap extends in front of, and generally parallel to, the front surface of the mounting platform and spaced from the cup portions of the suction cups to form a space between the retention strap and the suction cups for receiving the electronic device, and wherein a third portion of the retention strap extends rearward to fasten to said first portion of the retention strap in a tightened configuration capturing the electronic device against the suction cups; and a connector at, or near, a bottom end of the mounting platform for detachably connecting to a stationary object or wearable apparatus so that the mounting apparatus and its captured electronic device are positioned for hands-free video recording.

The mounting apparatus wherein the apertures extend all the way through the mounting platform, and the adaptation of the apertures to removably retain the base portions is selected from the group consisting of: retention posts extending into central regions of the apertures and being received in holes in the base portions of the suction cups, and the apertures comprising retention-portions and elongated insertion-portions extending from the retention-portions so that the base portions are inserted into said elongated insertion-portions of the apertures and then slid sideways into said retention-portions of the apertures to be held tightly in said retention-portions.

A mounting apparatus wherein the connector comprises a lower protrusion pivotally and detachably mating with arms of a mount attached to said stationary object or wearable apparatus. A mounting apparatus wherein said retention strap extends more than 360 degrees around the mounting platform. The mounting platform comprises elongated members at or near a top edge of the platform and generally parallel to said top edge, and the retention strap first portion is connected to the mounting platform by the retention strap comprising a loop receiving said elongated members. The retention strap extends through an elongated aperture in the mounting platform at or near the bottom end of the mounting platform, the elongated aperture being transverse to the length of the retention strap.

The mounting apparatus contains a retention strap which preferably extends through an elongated aperture in the mounting platform at or near the bottom end of the mounting platform, the elongated aperture being transverse to the length of the retention strap. The said third portion of the retention strap fastens to the first portion by hook-and-loop fastener.

A mount system for hands-free video recording, the system comprising: an electronic device with video recording capability; and a mounting apparatus comprising: a generally vertical mounting platform having a front surface and a rear surface; at least one suction cup having a base portion and a cup portion, the at least one suction cup being connected to the mounting platform so that the cup portion protrudes forward from the mounting platform and is removably connected by suction to the electronic device; and a retention strap connected at one end to the mounting platform and extending around a front side of the electronic device to force the electronic device against the at least one suction cup; so that the electronic device is retained on the mounting apparatus by both said at least one suction cup and said retention strap.

The mount system with retention strap that extends more than 360 degrees around the mounting platform. The mount system preferably includes a retention strap that has a proximal end connected to the mounting platform at or near a top end of the mounting platform, and a fastener at an opposing distal end, the retention strap extending downward from at or near the top end along the rear surface of the mounting platform, through a slot opening at a bottom end of the mounting platform, upward in front of and around the electronic device, and over the top end of the mounting platform toward the rear surface of the mounting platform, wherein the distal end fastener connects to a portion of the retention strap that is behind the mounting platform, to place the retention strap in a tightened configuration against the electronic device.

The mount system allows for the screen of the electronic device to face the mounting platform. The mounting platform comprises an aperture receiving a base portion of the at least one suction cup and a retention post extending into the aperture and received in a side-pilot-hole of the base portion. The aperture is ovular-shaped and the retention post extends about half-way across the ovular-shaped aperture, so that the base is installed by insertion into the ovular-shaped aperture adjacent to the retention post and then sliding onto the retention post. At least one suction cup comprises a set of two suction cups received in a set of two of said apertures. The mount system is optionally designed so that at least one suction cup comprises a set of mini thick-neck suction cups each having a cup portion, a base portion, and a neck portion between said cup portion and said base portion, wherein said set of mini thick-neck suction cups are connected to the mounting platform at or near a center of the mounting platform and the bases of said set of mini thick-neck suction cups are within about 2 inches of each other, for suction-connection to the electronic device in front of said mounting platform near said center.

The optionally included mini thick-neck suction cups are retained in apertures each having a circular-shaped portion and an elongated portion extending from the circular-shaped portion, wherein the elongated portions are of sufficient length and width to loosely receive said bases of the mini-thick-neck suction cups prior to the mini thick-neck suction cups being pushed sideways toward said circular-shaped portions so that the neck portions of the mini-thick-neck suctions cups are tightly captured in the circular-shaped portions. The mount system preferably includes a retention strap which is elastic and comprises grip-material on a side that faces the electronic device. The mount system utilizes a mounting platform comprising an aperture for said at least one suction cup, and each suction cup is slidable sideways in its respective aperture between a portion of the aperture wherein the base portion is captured in the aperture and a portion of the aperture wherein the base is free to be removed from the aperture for separation from the mounting platform. The mount system preferably includes a mounting platform that is a rigid plate, and the mount system further comprises a connector for connecting the mounting apparatus to a stationary object or wearable apparatus.

The device-capturing strap that extends from the mounting plate may be textiles, woven or braided material, polymeric or rubber materials, or other preferably flexible and elastic material, but, most preferably, they are materials having elasticity and the capacity to maintain their integrity through conventional sewing techniques. The preferred material could optionally contain strips of silicone material applied, adhered, or attached to one side of the strap to create a "grippy" effect between the device and the strap itself. The preferred materials are not permanently deformed from normal stretching, but return to their original shape once the stretching stress (tension) is removed. Typically, fabrics having these qualities are not translucent. Non-limiting examples of materials that can be used include synthetic rubbers such as neoprene (polychloroprene); petrochemical based or other synthetically manufactured fibrous materials such as spandex (elastane), nylon, olefin fiber, polyester fabric, rayon, and particularly combinations and blends of the noted materials with each other and with other animal, plant, mineral or synthetic based textile such as cotton. In one aspect, the flexible and elastic fabric material can include a blend including neoprene and spandex.

The mounting plate and suction cup assembly is adapted to limit relative movement between the mounting plate and the electronic device when the retention strap is tightened. As used herein, the terms "tightened" and "tightly" refer to a fit including direct physical contact between at least a majority of surfaces sufficient to create a resistance to displacement due to the frictional forces caused by said direct physical contact of the surfaces. For proper use of the strap, the amount of friction maintaining placement of an electronic device in an associated strap is sufficient to reliably counteract gravity, but is preferably relatively easy to overcome by purposeful user manipulation (as with inserting and removing the electronics device).

As used herein, directional-based descriptive terms, such as "front," "back," "side," "top," "bottom," and the like are used for ease of discussion. Such use is not to be interpreted as requiring use only in such direction or orientation, but only that these directional descriptors help the writer to describe elements of the embodiments relative to each other, and to describe the elements relative to example (but not necessarily all) electronic devices As used herein, the terms portrait and landscape refer to the page orientation of the camera/device as being vertical or horizontal. Page orientation is the way in which a rectangular page, or photograph, is oriented for normal viewing, in this case referenced as a vertical orientation of a rectangular shaped device. The two most common types of orientation are portrait and landscape. The specific word definition comes from the fact that a close-up portrait of a person's face and upper body is more fitting for a canvas or photo where the height of the display area is greater than the width. Landscape originally described artistic outdoor scenes where a wide view area is needed, but the upper part of the photo would be mostly sky and so is omitted. In this case, landscape is referred to as a horizontal orientation of a rectangular shaped electronic device (long dimension of the device being horizontal).

The lower strap slot may also be used to create a loop opening at the back side of the mount, which allows a device to be inserted in landscape orientation and securely held in place, with front facing suction cups then attached to a smooth surface. The electronic device, when captured in the rear loop strap (not on suction cups at front), may be rearward against the main body of the mounting plate and within the elastic strap loop which acts as a capture and retention system for the device. The mount itself can be rotated upwards or downwards to alter the desired field of view that is being captured during the video-taking process, thus providing some basic adjustability with regards to field of view. This is done by loosening and tightening the screw mechanism which connects the male and female ends of the mounting system. The screw thereby tightens the adjacent surfaces of the coupled mount connectors to create a tight connection between the parts as to not allow them to easily be rotated, which is preferred.

In certain embodiments, the mounting plate comprises generally rectangular openings/slots to allow an elastic strap to be inserted and pulled through, and/or arms for receiving loops of the elastic strap. The main body of the mount platform is preferably wider than the elastic strap material, to allow the preferred strap to attach in the desired fashion. The retention strap is sized in length so that the distal end may extend through the slot within the lower portion of the mounting plate, encircle the electronic device, extend back up over the device, and fasten back upon itself at the proximal end by hook-and-loop fastening.

The elastic retention strap may be disconnected from itself and loosened to receive the electronic device onto the exposed suction cups, then extend back over the device and attached upon itself. Once retightened, the retention strap holds the electronic device onto the suction cups to maintain the preferred suction while the device is preferably "held horizontally" in a landscape orientation with the electronic device secured to the central region of the mounting plate. Therefore, the preferred mounting plate, side pilot hole suction cups, and retention strap thus is adapted to hold the electronic device horizontally with its lens exposed, with the desired field of view captures in the video established by the rotatable mounting connectors (male and female sides) and screw mechanism.

In the secondary use for hands free photos/videos, after the record button of the electronic device is pushed to initiate recording, the electronic device is inserted into the loop opening between the mounting plate and retention strap at the rear of the plate (leaving the camera lens exposed), and the retention strap is then sufficiently tightened around the device while extended through the lower slot opening, inserted between the front facing suction cups, and fastened back upon itself over the top of the mount. The user can then attach the exposed suction cups to a smooth vertical surface to allow for hands free video recording. Alternatively, a timer or specialty shutter function can be initiated on the electronic device which can then be inserted into the loop opening and mounting plate, secured in place, and then the entire apparatus can be attached to a smooth vertical surface via the multiple suction cups. This device may be extremely useful for spectators who want hands free pictures or video during day to day activities. This invention may be extremely useful for people who cannot afford expensive video recording devices and desire to use their smartphone for action video recording (primary use), and hands free pictures and video from a smooth surface (secondary use).

The specialty mounting plate is preferably firm, for example, rigid, so that the various features of the main body do not bend, droop, or twist. The preferred elastic strap material is somewhat flexible and soft, allowing for secure retention of the device. The firm exterior of the specialty mounting plate keeps the suction cups oriented in the desired attachment of the electronic device pointing in the desired and predictable direction for proper pointing at the subject of the video, rather than twisting out of the desired field of view, or plane. Due to the rigidity of the mounting plate and orientation of the suction cups, it is preferred that the device is first attached to the suction cups on the screen of the device, and then the strap is attached around the device in the preferred orientation.

The main body of the mounting plate may be described as having multiple features; slot arms extending inwards from the upper region of the part, suction cup retention posts and slot openings at the central region of the part, a lower slot opening within the lower region, and two parallel connector features with central holes extending from the bottom of the mount to serve as the attachment point at which to insert into the female side of the corresponding mount system. The preferred height of the mounting plate is a distance that is equal to or less than the width of the largest electronic device that may be used with the device. If the length of the vertical support platform is too short, the lower strap slot opening will be covered thereby restricting the retention strap from being able to enter the slot opening. Additionally, if the strap slots are too far beneath the device, the strap may create a forward force pushing the device off of the suction cups, which may result in less than preferred tightness of the resulting hold between the cups and the device being secure to the mounting plate. The preferred width and height of the lower slot opening is sufficient to allow the distal end of the retention strap to be inserted and pulled through the slot opening. The device can therefore be secured to the front or back of the mounting plate depending on the desired function. This combination of functions are unique features of the apparatus, because, when combined, they allow for dual use; action video recording within a two part mounting system as well as hands free pictures/video from a smooth vertical surface.

The retention strap (17) is preferably flexible or at least bendable, so that it may effectively curve/wrap around the electronic device, fold/bend upon itself, and/or around portions of the mounting plate, and/or curve/wrap/fold/bend as needed for fitting the device. Some inflexibility along short lengths may be acceptable, for example, as hook-and-loop patches can reduce flexibility in their regions. A "grippy" strap could optionally be used for the retention strap apparatus as well, thereby providing some additional grip between the electronic and mount to ensure the device remains in place while in use. The medium suction cups are utilized to provide a strong hold on the device. The preferred medium sized suction cups are each rated for approximately 2.5-3 lbs of weight, therefor the combined strength of the cups onto the screen of the device creates a sufficiently tight hold between the device and the mount. The addition of the retention strap over the top of the device further provides additional holding strength of the mounting system and forces the device downward onto the suction cups to ensure the suction is maintained during use. This combination of securement features is a unique combination that results in a high level holding strength relative to the device to ensure that the device does not fall from, or come out of the mount.

The preferred slot/arm-systems are shown for connection of loop-end of the retention strap to the mounting plate.

Also, the suction cup slots and retention arms within the main body of the mounting plate allow the side pilot hole suction cups to be removably attached, but are oriented in a specific configuration to ensure a tight hold on the device, and allowing for use with a high percentage of touch screen devices. The intent is to create a compact design as these systems are effective but not bulky or cumbersome. These systems also provide secure connection of the electronic device to the mounting plate, while still allowing the strap and suction cups to be removed and replaced as desired. However, in certain embodiments, other fasteners/connectors may be used for connection of the straps to the mounting plate, for example, buckles, snaps, ties, or various quick-connect and quick-disconnect fasteners.

Hook-and-loop fasteners are the preferred quick-connect/disconnect fasteners for "securing" or "latching" the retention strap in its tightened configuration. Patches 17-B and 17-C that are about 1.5" inches wide and 1.5"-2" long are secured to proximal end of the strap, while such patches of material could be secured to one or both sides of the distal end of the strap, as the strap could optionally extend around in either direction. The hook-and-loop fastener may be sewn into place or adhesively-attached, for example.

The preferred materials described herein are available through conventional commerce. The elastic strap materials and suction cups described can be purchased at craft stores, material outlets, specialty stores, and directly from manufacturers. In addition, there are a variety of manufacturers and dealers of such materials online, which allows for bulk purchasing of such materials.

Certain embodiments may be described as a specialty universal mount apparatus for an electronic device with video recording capability, the mount apparatus comprising, consisting essentially of, or consisting of: a mounting plate having a generally vertical platform; multiple suction cups attached to slot openings and retention posts within the main body of the platform, a retention strap having one end connected to a slot/arm attachment at the top of the mounting plate and a fastener at an opposing end, the retention strap extending downward at the rear of the mounting plate and through a slot opening then around front of the mount forming a space between the retention strap and the front surface of the generally vertical mount for receiving the electronic device, wherein the retention strap is fastened in a tightened configuration over the electronic device to hold the electronic device against the suction cups and mounting plate; and two circular extension with holes that extend from the bottom of the mounting plate to act the male portion of a two part mounting system which can therefore be connected to the female side of the mount and held in place via a screw mechanism. The retention strap may alternatively extend between the suction cups at the front of the mount to create a loop opening between the strap and the rear portion mounting plate at which to insert an electronic device in landscape orientation, thereafter the retention strap may extend upward and around the device to fasten distal end with fastener to the portion of the retention strap located at the top mounting plate, so that the retention strap fastens to itself after looping through said slot. The retention strap may comprise a proximal end loop, wherein the mounting plate may comprise a set of top-strap arms extending from the top of the mounting plate and removably received in the proximal end loop. The suction cups that attach to the front of the mount are designed to face and attach to the screen of the electronic device for gripping and capturing of the electronic device even in the event the holder moves quickly or drastically.

Certain embodiments may be described as a universal smartphone mount system for action related video recording from an object or wearable apparatus, the system comprising, consisting essentially of, or consisting of: an electronic device with video recording capability; and an attachable/detachable mount apparatus comprising, consisting essentially of, or consisting of: a generally flat rectangular shaped mounting plate having a generally vertical platform and suction cups form between them a location for receiving the electronic device so that a smooth touch screen surface of the electronic device is against the suction cups in line with the generally vertical platform; a retention strap having a proximal end connected to a slot arms at the top of the mounting plate and a fastener at an opposing distal end, the retention strap extending downward at the rear of the mount, through a slot opening, and over the electronic device and back around the top and down wherein the retention strap distal end is fastened to the proximal end with the retention strap in a tightened configuration against the electronic device. The electronic device preferably has a lens near one end for video recording, wherein the lens is not covered/obstructed by any part of the mount device, specifically not covered/obstructed by the mounting plate or the retention strap.

Certain embodiments may be methods of using any of the apparatus disclosed herein. For example, embodiments may be a method of securing an electronic device within a two part system, the first part including a mount apparatus that is operable with an electronic device with a male connector to allow connection with a female side of the second part to complete the mounting system to securely hold a device in place during video recording, the method comprising: providing a suction cup enabled-mount apparatus including a suction cup assembly, retention strap, and mounting plate; detaching the distal end patch of fastener from the proximal end patch of fastener to allow the device loop opening to be created between the retention strap and vertical mount platform; detaching the retention strap to create an opening also exposing the front facing suction cups, first placing an electronic device horizontally onto the suction cups, which is also the opening between the strap and the mount, whereby the device is held in the proper orientation/direction to capture the desired field of view; tightening the retention strap to retain the device securely therein; and attached the male connector portion of the mounting plate to the corresponding female connector of the fixed portion of the mount to provide a complete mounting system to allow a device to be securely held in place during video recording. The female connector could either be affixed to an object, or a wearable apparatus intended to be worn by a person, or other living animal.

Although this invention has been described above with reference to particular means, materials and embodiments, it is to be understood that the invention is not limited to these disclosed particulars, but extends instead to all equivalents within the broad scope of the following claims.

What is claimed is:
1. A mounting apparatus for an electronic device with video recording capability, the mounting apparatus consisting essentially of:
   a mounting platform having a generally vertical front surface and a rear surface;
   at least one set of suction cups, wherein the mounting platform comprises at least one set of apertures adapted to receive and removably retain base portions of said at least one set of suction cups to removably connect the suction cups to the mounting platform with cup portions of the suction cups extending forward out away from the front surface of the mounting platform;
   a retention strap connected to the mounting platform, wherein a first portion of the retention strap extends along the rear surface of the mounting platform, a second portion of the retention strap extends in front of, and generally parallel to, the front surface of the mounting platform and spaced from the cup portions of the suction cups to form a space between the retention strap and the suction cups for receiving the electronic device, and wherein a third portion of the retention strap extends rearward to fasten to said first portion of the retention strap in a tightened configuration capturing the electronic device against the suction cups; and
   a connector at, or near, a bottom end of the mounting platform for detachably connecting to a stationary object or wearable apparatus so that the mounting apparatus and its captured electronic device are positioned for hands-free video recording.

2. The mounting apparatus as in claim 1, wherein the apertures extend all the way through the mounting platform, and the adaptation of the apertures to removably retain the base portions is selected from the group consisting of: retention posts extending into central regions of the apertures and being received in holes in the base portions of the suction cups, and the apertures comprising retention-portions and elongated insertion-portions extending from the retention-portions so that the base portions are inserted into said elongated insertion-portions of the apertures and then slid sideways into said retention-portions of the apertures to be held tightly in said retention-portions.

3. The mounting apparatus as in claim 1, wherein the connector comprises a lower protrusion pivotally and detachably mating with arms of a mount attached to said stationary object or wearable apparatus.

4. The mounting apparatus as in claim 1, wherein said retention strap extends more than 360 degrees around the mounting platform.

5. The mounting apparatus as in claim 4, wherein the mounting platform comprises elongated members at or near a top edge of the platform and generally parallel to said top edge, and the retention strap first portion is connected to the mounting platform by the retention strap comprising a loop receiving said elongated members.

6. The mounting apparatus as in claim 4, wherein said retention strap extends through an elongated aperture in the mounting platform at or near the bottom end of the mounting platform, the elongated aperture being transverse to the length of the retention strap.

7. The mounting apparatus as in claim 5, wherein said retention strap extends through an elongated aperture in the mounting platform at or near the bottom end of the mounting platform, the elongated aperture being transverse to the length of the retention strap.

8. The mounting apparatus as in claim 4, wherein said third portion of the retention strap fastens to the first portion by hook-and-loop fastener.

9. A mount system for hands-free video recording, the system comprising:
   an electronic device with video recording capability; and
   a mounting apparatus comprising:
   a generally vertical mounting platform having a front surface and a rear surface;
   at least one suction cup having a base portion and a cup portion, the at least one suction cup being connected to the mounting platform so that the cup portion protrudes forward from the mounting platform and is removably connected by suction to the electronic device; and a retention strap connected at one end to the mounting platform and extending around a front side of the electronic device to force the electronic device against the at least one suction cup;

so that the electronic device is retained on the mounting apparatus by both said at least one suction cup and said retention strap;

wherein said retention strap extends more than 360 degrees around the mounting platform; and wherein said retention strap has a proximal end connected to the mounting platform at or near a top end of the mounting platform, and a fastener at an opposing distal end, the retention strap extending downward from at or near the top end along the rear surface of the mounting platform, through a slot opening at a bottom end of the mounting platform, upward in front of and around the electronic device, and over the top end of the mounting platform toward the rear surface of the mounting platform, wherein the distal end fastener connects to a portion of the retention strap that is behind the mounting platform, to place the retention strap in a tightened configuration against the electronic device.

10. The mount system as in claim 9, wherein a screen of the electronic device faces the mounting platform.

11. The mount system as in claim 9, wherein the mounting platform comprises an aperture receiving a base portion of the at least one suction cup and a retention post extending into the aperture and received in a side-pilot-hole of the base portion.

12. The mount system as in claim 11, wherein the aperture is ovular-shaped and the retention post extends about halfway across the ovular-shaped aperture, so that the base is installed by insertion into the ovular-shaped aperture adjacent to the retention post and then sliding onto the retention post.

13. The mount system as in claim 11, wherein said at least one suction cup comprises a set of two suction cups received in a set of two of said apertures.

14. A mount system for hands-free video recording, the system comprising:

an electronic device with video recording capability; and a mounting apparatus comprising:

a generally vertical mounting platform having a front surface and a rear surface;

at least one suction cup having a base portion and a cup portion, the at least one suction cup being connected to the mounting platform so that the cup portion protrudes forward from the mounting platform and is removably connected by suction to the electronic device; and a retention strap connected at one end to the mounting platform and extending around a front side of the electronic device to force the electronic device against the at least one suction cup;

so that the electronic device is retained on the mounting apparatus by both said at least one suction cup and said retention strap;

wherein said at least one suction cup comprises a set of mini thick-neck suction cups each having a cup portion, a base portion, and a neck portion between said cup portion and said base portion, wherein said set of mini thick-neck suction cups are connected to the mounting platform at or near a center of the mounting platform and the bases of said set of mini thick-neck suction cups are within about 2 inches of each other, for suction-connection to the electronic device in front of said mounting platform near said center.

15. The mount system as in claim 14, wherein said mini thick-neck suction cups are retained in apertures each having a circular-shaped portion and an elongated portion extending from the circular-shaped portion, wherein the elongated portions are of sufficient length and width to loosely receive said bases of the mini-thick-neck suction cups prior to the mini thick-neck suction cups being pushed sideways toward said circular-shaped portions so that the neck portions of the mini-thick-neck suctions cups are tightly captured in the circular-shaped portions.

16. The mount system as in claim 9, wherein the retention strap is elastic and comprises grip-material on a side that faces the electronic device.

17. A mount system for hands-free video recording, the system comprising:

an electronic device with video recording capability; and a mounting apparatus comprising:

a generally vertical mounting platform having a front surface and a rear surface;

at least one suction cup having a base portion and a cup portion, the at least one suction cup being connected to the mounting platform so that the cup portion protrudes forward from the mounting platform and is removably connected by suction to the electronic device; and a retention strap connected at one end to the mounting platform and extending around a front side of the electronic device to force the electronic device against the at least one suction cup;

so that the electronic device is retained on the mounting apparatus by both said at least one suction cup and said retention strap;

wherein the mounting platform comprises an aperture for said at least one suction cup, and each suction cup is slidable sideways in its respective aperture between a portion of the aperture wherein the base portion is captured in the aperture and a portion of the aperture wherein the base is free to be removed from the aperture for separation from the mounting platform.

18. The mount system as in claim 17, wherein the mounting platform is a rigid plate, and the mount system further comprises a connector for connecting the mounting apparatus to a stationary object or wearable apparatus.

* * * * *